(12) United States Patent
Ding et al.

(10) Patent No.: US 11,199,729 B2
(45) Date of Patent: Dec. 14, 2021

(54) OPTICAL ARTICLE WITH HIGH REFLECTION IN THE NEAR INFRARED REGION AND IN THE BLUE LIGHT REGION

(71) Applicant: ESSILOR INTERNATIONAL, Charenton-le-Pont (FR)

(72) Inventors: Xingzhao Ding, Singapore (SG); Shi Qin Gracia Loo, Singapore (SG); Andrew Rosales Pelayo, Singapore (SG)

(73) Assignee: Essilor International, Charenton-le-Pont (FR)

( * ) Notice: Subject to any disclaimer, the term of this patent is extended or adjusted under 35 U.S.C. 154(b) by 100 days.

(21) Appl. No.: 16/324,043

(22) PCT Filed: Apr. 28, 2017

(86) PCT No.: PCT/IB2017/000666
§ 371 (c)(1),
(2) Date: Feb. 7, 2019

(87) PCT Pub. No.: WO2018/029516
PCT Pub. Date: Feb. 15, 2018

(65) Prior Publication Data
US 2019/0171039 A1 Jun. 6, 2019

(30) Foreign Application Priority Data
Aug. 9, 2016 (EP) .................................... 16306040

(51) Int. Cl.
*G02C 7/10* (2006.01)
*G02B 5/28* (2006.01)
*G02B 1/115* (2015.01)

(52) U.S. Cl.
CPC .............. *G02C 7/107* (2013.01); *G02B 1/115* (2013.01); *G02B 5/282* (2013.01)

(58) Field of Classification Search
CPC .......... G02C 7/107; G02C 7/10; G02C 7/104; G02B 5/282; G02B 1/115; G02B 5/20;
(Continued)

(56) References Cited

U.S. PATENT DOCUMENTS

| 4,211,823 A | 7/1980 | Suzuki et al. |
| 5,015,523 A | 5/1991 | Kawashima et al. |

(Continued)

FOREIGN PATENT DOCUMENTS

| EP | 0614957 | 9/1994 |
| FR | 2943798 | 10/2010 |

(Continued)

OTHER PUBLICATIONS

Algvere et al., "Age-related maculopathy and the impact of blue light hazard" Acta Ophthalmologica Scandinavica, 2006, 84:4-15.
(Continued)

*Primary Examiner* — Jordan M Schwartz
(74) *Attorney, Agent, or Firm* — Norton Rose Fulbright US LLP

(57) ABSTRACT

This invention relates to an optical article comprising a transparent substrate coated with an antireflective coating comprising at least two layers having a low refractive index, and at least two layers having a high refractive index, one layer having a high refractive index being the nearest from said substrate, characterized in that the total physical thickness of said antireflective coating is equal to or lower than 600 nm, and such that: —the mean reflection factor in the near infrared region is higher than or equal to 20% at an angle of incidence lower than 35°, and —the mean reflection factor $R_m^B$ of blue light at a wavelength ranging from 420 to
(Continued)

Exemple 1

450 nm is higher than or equal to 7.0% at an angle of incidence lower than 15°.

21 Claims, 6 Drawing Sheets

(58) Field of Classification Search
CPC .......... G02B 5/28; G02B 5/281; G02B 5/286; G02B 1/11; G02B 1/111; G02B 1/113
See application file for complete search history.

(56) References Cited

U.S. PATENT DOCUMENTS

| | | | |
|---|---|---|---|
| 2004/0218282 A1* | 11/2004 | Watanabe | G02B 5/283 |
| | | | 359/656 |
| 2009/0290219 A1* | 11/2009 | Terayama | G02B 1/115 |
| | | | 359/586 |
| 2010/0330378 A1 | 12/2010 | Takahashi et al. | |
| 2013/0071579 A1 | 3/2013 | Roisin et al. | |
| 2014/0009835 A1 | 1/2014 | Shibuya et al. | |
| 2015/0146161 A1* | 5/2015 | Rigato | G02B 5/282 |
| | | | 351/159.6 |
| 2015/0285956 A1* | 10/2015 | Schmidt | G02B 1/005 |
| | | | 359/352 |
| 2016/0223716 A1 | 8/2016 | Nouvelot et al. | |
| 2018/0067243 A1* | 3/2018 | Shiono | G01J 1/0488 |

FOREIGN PATENT DOCUMENTS

| | | |
|---|---|---|
| WO | WO 2011/080472 | 7/2011 |
| WO | WO 2012/076714 | 6/2012 |
| WO | WO 2015/080160 | 6/2015 |

OTHER PUBLICATIONS

International Search Report and Written Opinion issued in International Patent Application No. PCT/IB2017/000666, dated Aug. 7, 2017.

Kitchel, "The Effects of Blue Light on Ocular Health" *Journal of Visual Impairment and Blindness*, 2000, 94(6), Accessed from the Internet URL < https://www.tsbvi.edu/instructional-resources/62-family-engagement/3654-effects-of-blue-light>.

Tomany et al., "Sunlight and the 10-year Incidence of Age-Related Maculopath," *Arch Ophthalmol.*, 2004, 122:750-757.

* cited by examiner

Exemple 13

Exemple 17

OPTICAL ARTICLE WITH HIGH REFLECTION IN THE NEAR INFRARED REGION AND IN THE BLUE LIGHT REGION

CROSS-REFERENCE TO RELATED APPLICATIONS

This application is a national phase application under 35 U.S.C. § 371 of International Application No. PCT/IB2017/000666 filed 28 Apr. 2017, which claims priority to European Patent Application No. 16306040.3 filed 9 Aug. 2016. The entire contents of each of the above-referenced disclosures is specifically incorporated by reference herein without disclaimer.

FIELD OF THE INVENTION

The present invention relates to an optical article comprising an antireflective coating having both high reflection in the near infrared (NIR) region (780-1400 nm) and in the harmful blue light region (420-450 nm), while also strongly reducing reflection in the visible region (380 to 780 nm). The optical article may especially be an ophthalmic lens, such as a spectacle lens.

DESCRIPTION OF RELATED ART

Throughout life, the eye is exposed to daily fluxes of solar radiation. Solar radiation is filtered by the Earth's atmosphere so that at sea level about 80% of the solar energy is restricted to a narrow spectral band from about 300 nm in the ultraviolet to 1100 nm in the infrared. Longer wavelengths are primarily filtered out by atmospheric water vapor, whereas shorter wavelengths are absorbed by the ozone layer. Furthermore, certain spectral components of solar light incident on the cornea are partially filtered out before reaching the human retina. Both the cornea and the lens absorb part of the infrared radiation—mainly the water bands at 980 nm, 1200 nm, and 1430 nm. The vitreous absorbs light above 1400 nm, up to 10 µm.

Thus, the non-ionizing radiation reaching the retina is the so-called 'visible component' of the electromagnetic spectrum (380-780 nm), and some of the near infrared (780-1400 nm, NIR).

However, visible and infrared light reaching the human retina can induce tissue damage via at least one of three fundamental processes: photomechanical (or photoacoustic), photothermal (photocoagulation) and photochemical, depending on its fluence rate, total dose and spectral characteristics.

Especially, intensive NIR would be harmful to retina. It has been also reported that NIR could be one of the potential causes for dry eyes and cataracts.

In addition, light that is visible to humans extends over a light spectrum ranging from a 380 nanometers (nm) wavelength to a 780 nm wavelength approximately. The part of this spectrum, ranging from around 380 nm to around 500 nm, corresponds to a high-energy, essentially blue light.

Ultraviolet (UV) light is the portion of the luminous spectrum from 380 nm to 100 nm. The UVB corresponds to the range from 280 nm to 320 nm and the UVA to the range from 320 to 380 nm.

Many studies (see for example Kitchel E., "*The effects of blue light on ocular health*", Journal of Visual Impairment and Blindness Vol. 94, No. 6, 2000 or Glazer-Hockstein and al., Retina, Vol. 26, No. 1. pp. 1-4, 2006) suggest that blue light has harmful effects on the eye, and especially on the retina.

Indeed, ocular photobiology studies (Algvere P. V. and al., "*Age-Related Maculopathy and the Impact of the Blue Light Hazard*", Acta Ophthalmo. Scand., Vol. 84, pp. 4-15, 2006) and clinical trials (Tomany S. C. and al., "*Sunlight and the 10-Year Incidence of Age-Related Maculopathy. The Beaver Dam Eye Study*", Arch Ophthalmol., Vol. 122. pp. 750-757, 2004) demonstrated that an excessively prolonged or intense exposure to blue light may induce severe ophthalmic diseases such as age-related macular degeneration (ARMD).

Thus, prolonged exposure to harmful blue light may cause retinal damage. For instance, extensive exposure (higher than 3-4 hours per day) to blue-light emitted by digital devices (computers, smartphones, tablets, etc.) is one of the main reason for experiencing eye fatigue, blurred vision, dry eyes, and headaches.

However, part of this blue light, with a wavelength ranging from 465 nm to 495 nm approximately, promotes health since it is implicated in mechanisms for regulating biorhythms, referred to as "circadian cycles".

Thus, it is desirable to limit both the exposure to potentially harmful blue light, in particular as regards to the wavelength band which presents an increased risk, and to harmful NIR.

Moreover, it is important for clear lenses, to have also a high transmittance in visible region by using, in general, an antireflection coating (AR).

Currently, traditional antireflective coatings are often designed and optimized to reduce reflection on the lens surface in the visible region, typically within the spectrum range of from 380 to 780 nm, but without features to limit transmission of both the near infrared (NIR) region and the blue light region.

To be qualified as antireflective according to ISO 8980-4 standard, coatings must have a mean light reflection factor below 2.5%. In general, the mean light reflection factor in the visible region $R_v$ on the front and/or rear faces of an ophtalmic lens is between 1.5 to 2.5%.

An antireflection coating is usually a multilayer stack comprising interferential thin layers, generally an alternation of layers based on a dielectric material of high refractive index and a dielectric material of low refractive index. When deposited on a transparent substrate, the function of such a coating is to reduce its light reflection and therefore to increase its light transmission. A substrate thus coated will therefore have its transmitted light/reflected light ratio increased, thereby improving the visibility of objects placed behind it. When it is sought to achieve a maximum antireflection effect, it is then preferable to provide both faces (front and rear faces) of the substrate with this type of coating.

Accordingly, it is nowadays well known how to achieve an efficient coating with very low reflection in visible region.

However it is difficult to achieve an efficient coating having both an high reflection in the NIR region and blue light region, while having a very low reflection in visible region, especially in the ophtalmic field requiring very thin antireflective film.

Indeed, conventionally, interferential multilayer NIR filters have more than 40 layers. These kinds of stacks are too thick, have high internal stress and have too many layers, which are not practically acceptable for ophthalmic lens applications due to mechanical issues and economic reasons. Moreover, most of these IR filters do not cope with blue cut.

In addition, optimizing the reflection performances over the NIR region reveals generally detrimental to the antireflective performances in the visible region. Conversely, optimizing only the antireflective performances in the visible region does not make sure that satisfactory reflection properties can be obtained in the NIR region. The addition of another constraint, namely optimizing the reflection in harmful blue light region, increases the difficulty for reaching the intended goal.

Document US 2015/0146161 assigned to Indo Optical describes a multiple layer stack that reflects a significant percentage of infra-red radiation while it maintains the antireflective properties in the visible, with a limited angular dispersion in the residual reflection, by adapting standard antireflective filter technology. Most of the exemplified stacks presented in this document have 4 layers: $TiO_2/SiO_2/TiO_2/SiO_2$ or 5 layers: $SiO_2/TiO_2/SiO_2/TiO_2/SiO_2$ or 6 layers: $TiO_2/SiO_2/TiO_2/SiO_2/TiO_2/SiO_2$. The most preferred example is: $SiO_2$ (15 nm)/$TiO_2$ (127 nm)/$SiO_2$ (176 nm)/$TiO_2$ (59 nm)/$ZrO_2$ (50 nm)/$SiO_2$ (62 nm), named hereafter "commercial Indo $AR_{NIR}$".

The antireflective coatings described in this application, especially the most preferred example, are quite efficient in the NIR region (T IR-A=72.0%, so the $R_m^{NIR}$<30%), while being at the same time capable of relatively reducing the reflection in the visible region ($R_v$ 15°=0.9% and $R_v$ 60°=4.7%). The mean reflection factor of blue light $Rm^B$ (420 to 450 nm) at an angle of incidence of 15° on the front surface of a commercial Indo $AR_{NIR}$ lens product was measured to be less than 3.5%, indicating poor protection against harmful blue light. Only one example (example 4) is focused on of blue light. The AR coating comprises in the direction moving away from the substrate: $SiO_2$ (70.6 nm)/$TiO_2$ (121.7 nm)/$SiO_2$ (226.0 nm)/$TiO_2$ (140.1 nm) and reflects about 45% of light with a wavelength of 440 nm with IR, 15°=4.7%. This high value of IR, is not acceptable for an antireflective coating.

The document WO2015/080160 describes some multi-layer AR NIR stacks (5 to 9 layers) comprising alternating high index and low index layers, wherein the high index layers include $Nb_2O_5$, $TiO_2$, $ZrO_2$, $Ta_2O_5$, while low index layers include $SiO_2$, $Al_2O_3$, $MgF_2$, $LaF_3$, $CaF_2$, $AlF_3$. Especially, this document discloses stacks comprising at least one thick layer of high refractive index material (optical thickness higher than 195 nm, examples are given with $ZrO_2$ and $Nb_2O_5$) and a maximum of reflectance in the NIR range (between 800 and 1350 nm). The exemplified stacks may also reflect blue light (as measured by BS2724 British standard and claimed through a "main wavelength" of reflectance according to JIS Z 8105). However, exemplified stacks are very thick (total physical thickness higher than 600 nm) except for Example 7, which is a comparative example and has a lower $R^{NIR}$ value (24%).

However, it would be advisable to improve the multiple layer coating described in this document.

Therefore, there is still a need to provide novel antireflective coatings having very good antireflective properties in the visible region, while having at the same time high reflection in the NIR region and high reflection in the harmful blue light region, versus the antireflective coatings of the prior art.

SUMMARY OF THE INVENTION

An object of the invention is therefore to remedy the above drawbacks, by seeking to develop a transparent optical article, especially an ophthalmic lens such as spectacle lens, comprising a substrate in mineral or organic glass comprising at least an antireflective coating (AR coating), said antireflective coating possessing very good antireflective performances in the visible region, while having high reflection both in the NIR region and blue light region and to do so without compromising the economic and/or industrial feasibility of its manufacture.

The invention therefore relates to an optical article, preferably an ophthalmic lens, comprising a transparent substrate with a front main face and with a rear main face, at least one of the main faces being coated with an antireflective coating comprising at least two layers having a low refractive index which is <1.55, defined as "LI layer", and at least two layers having a high refractive index which is ≥1.55, defined as "HI layer", one of the at least two HI layers being the layer which is the nearest from said substrate among said LI and HI layers, characterized in that the total physical thickness of said antireflective coating is equal to or lower than 600 nm,
and such that:
the mean reflection factor in the near infrared (NIR) region $R_m^{NIR}$ of said antireflective coating is higher than or equal to 20% at an angle of incidence lower than 35°, and
the mean reflection factor $R_m^B$ of blue light at a wavelength ranging from 420 to 450 nm has a first value $R_m^B{}_{(<15°)}$ which is higher than or equal to 7.0% at an angle of incidence lower than 15°.

Therefore, the optical article according to the invention comprises a highly efficient antireflective (AR) coating with high reflection in both the NIR region and the harmful blue light region.

BRIEF DESCRIPTION OF THE DRAWINGS

The present invention will be described in more detail by referring to the appended drawings, wherein.

DETAILED DESCRIPTION OF THE INVENTION AND PREFERRED EMBODIMENTS

Figure 1:
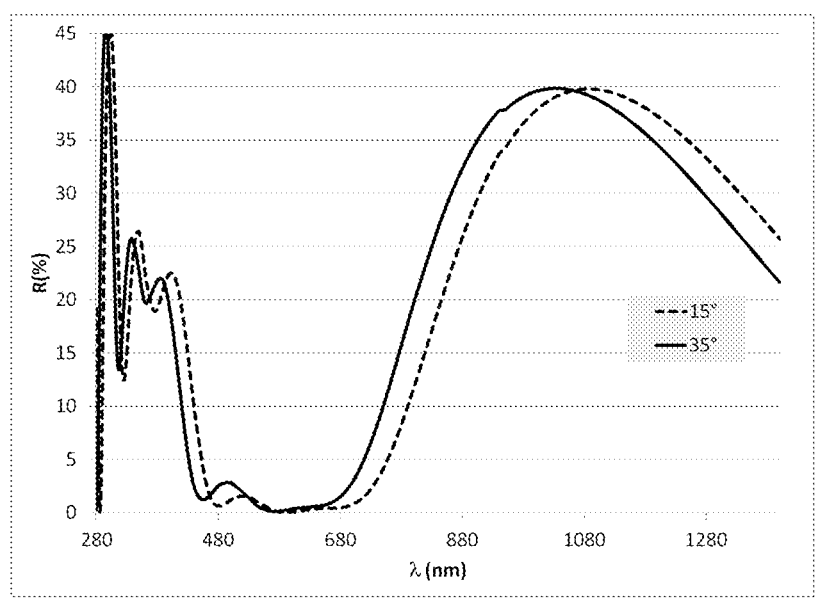
FIGS. 1 to 12 show the variation of the reflection R (%) on the front face surface of some lenses prepared in the examples of the present application (respectively according to the examples 1, 2, 4, 6, 8, 9, 13, 17, 20, 22, 25 and 28) at an angle of incidence θ of 15° and 35° as a function of the wavelength λ, (nm) in the UVB (280 to 315 nm), UVA (315 to 400 nm) bands, in the visible region (380 to 780 nm), in the harmful blue light region (420-450 nm) and in the NIR region (780-1400 nm).

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, ranges, reaction conditions, etc. used herein are to be understood as modified in all instances by the term "about."

Also unless otherwise indicated, the indication of an interval of values «from X to Y» or "between X to Y", according to the present invention, means as including the values of X and Y.

In the present application, when an optical article comprises one or more coatings onto the surface thereof, the expression "to deposit a layer or a coating onto the article" is intended to mean that a layer or a coating is deposited onto the external (exposed) surface of the outer coating of the article, that is to say its coating that is the most distant from the substrate.

A coating, that is said to be "on" a substrate or deposited "onto" a substrate is defined as a coating, which (i) is positioned above the substrate, (ii) is not necessarily in contact with the substrate, that is to say one or more intermediate coatings may be arranged between the substrate and the coating in question, and (iii) does not necessarily completely cover the substrate.

In a preferred embodiment, the coating on a substrate or deposited onto a substrate is in direct contact with this substrate.

When "a layer 1 is lying under a layer 2", it is intended to mean that layer 2 is more distant from the substrate than layer 1.

As used herein, the rear (or the inner) face of the substrate is intended to mean the face which, when using the article, is the nearest from the wearer's eye. It is generally a concave face. On the contrary, the front face of the substrate, is the face which, when using the article, is the most distant from the wearer's eye. It is generally a convex face.

In addition, according to the invention, the "angle of incidence (symbol θ)" is the angle formed by a ray light incident on an ophthalmic lens surface and a normal to the surface at the point of incidence. The ray light is for instance an illuminant light source, such as the standard illuminant D65 as defined in the international colorimetric CIE L*a*b*. Generally the angle of incidence changes from 0° (normal incidence) to 90° (grazing incidence). The usual range for angle of incidence is from 0° to 75°.

The colorimetric coefficients of the optical article of the invention in the international colorimetric system CIE L*a*b* are calculated between 380 and 780 nm, taking the standard illuminant D 65 and the observer into account (angle of 10°). The observer is a "standard observer" as defined in the international colorimetric system CIE L*a*b*. It is possible to prepare antireflective coatings, without limitation as regards their hue angle ("h°").

The present invention can be used in all kinds of optical devices and elements, such as ophthalmic elements and devices, display elements and devices, windows or mirrors. Non-limiting examples of ophthalmic elements include corrective and non-corrective lenses, including single vision or multi-vision lenses, which may be either segmented or non-segmented, as well as other elements used to correct, protect, or enhance vision, magnifying lenses and protective lenses or visors such as found in spectacles, glasses, goggles and helmets. Non-limiting examples of display elements and devices include screens and monitors. Non-limiting examples of windows include automotive and aircraft transparencies, filters, shutters, and optical switches. The optical article of the present invention is preferably a lens or lens blank, and more preferably an ophthalmic lens or lens blank. The optical article may be coated on its convex main side (front side), concave main side (back side), or both sides using the process of the invention.

Generally speaking, the antireflective coating of the optical article according to the invention, which will be called "the antireflective coating", may be deposited onto any substrate, and preferably onto organic lens substrates, for example a thermoplastic or thermosetting plastic material.

Thermoplastic may be selected from, for instance: polyamides; polyimide; polysulfones; polycarbonates and copolymers thereof; poly(ethylene terephthalate) and polymethylmethacrylate (PMMA).

Thermoset materials may be selected from, for instance: cycloolefin copolymers such as ethylene/norbornene or ethylene/cyclopentadiene copolymers; homo- and copolymers of allyl carbonates of linear or branched aliphatic or aromatic polyols, such as homopolymers of diethylene glycol bis(allyl carbonate) (CR 39®); homo- and copolymers of (meth)acrylic acid and esters thereof, which may be derived from bisphenol A; polymer and copolymer of thio(meth) acrylic acid and esters thereof, polymer and copolymer of allyl esters which may be derived from Bisphenol A or phthalic acids and allyl aromatics such as styrene, polymer and copolymer of urethane and thiourethane, polymer and copolymer of epoxy, and polymer and copolymer of sulphide, disulfide and episulfide, and combinations thereof.

As used herein, a (co)polymer is intended to mean a copolymer or a polymer. As used herein, a (meth)acrylate is intended to mean an acrylate or a methacrylate. As used herein, a polycarbonate (PC) is intended to mean either homopolycarbonates or copolycarbonates and block copolycarbonates.

Homopolymers of diethylene glycol bis(allyl carbonate) (CR 39®), allylic and (meth)acrylic copolymers, having a refractive index between 1.54 and 1.58, polymer and copolymer of thiourethane, polycarbonates are preferred.

The substrate may be coated with one or more functional coatings prior to depositing the antireflective coating of the invention. These functional coatings traditionally used in optics may be, without limitation, an impact-resistant primer layer, an abrasion-resistant coating and/or a scratch-resistant coating, a polarizing coating, a photochromic coating or a tinted coating. In the following a substrate means either a bare substrate or such a coated substrate.

Prior to depositing the antireflective coating, the surface of said substrate is usually submitted to a physical or chemical surface activating treatment, so as to reinforce the adhesion of the antireflective coating. Such pre-treatment is generally conducted under vacuum. It may be a bombardment with energetic and/or reactive species, for example with an ion beam ("Ion Pre-Cleaning" or "IPC") or with an electron beam, a corona discharge treatment, an ion spallation treatment, an ultraviolet treatment or a plasma-mediated treatment under vacuum, generally using an oxygen or an argon plasma. It may also be an acid or basic treatment and/or a solvent-based treatment (water, hydrogen peroxide or any organic solvent).

As previously mentioned, the optical article according to the invention comprises a transparent substrate with a front main face and with a rear main face, at least one of the main faces being coated with an antireflective coating comprising at least two layers having a low refractive index which is <1.55, defined as "LI layer", and at least two layers having a high refractive index which is ≥1.55, defined as "HI layer", one of the at least two HI layers being the layer which is the nearest from said substrate among said LI and HI layers, characterized in that the total physical thickness of said antireflective coating is equal to or lower than 600 nm, and such that:
  the mean reflection factor in the near infrared (NIR) region $R_m^{NIR}$ of said antireflective coating is higher than or equal to 20% at an angle of incidence lower than 35°, and
  the mean reflection factor $R_m^B$ of blue light at a wavelength ranging from 420 to 450 nm has a first value $R_{m\,(<15°)}^B$ which is higher than or equal to 7.0% at an angle of incidence lower than 15°.

Herein, the characteristic mean reflection factor in the near infrared (NIR) region $R_m^{NIR}$ (780-1400 nm) is defined by the formula:

$$R_m^{NIR} = \frac{\int_{780}^{1400} R(\lambda)d\lambda}{1400-780}$$

wherein R(λ) represents the reflection factor at wavelength λ. $R_m^{NIR}$ can be measured for any angle of incidence θ, based on R(λ) measured at the same angle of incidence.

The mean reflection factor $R_m^B$ of blue light (420-450 nm) is defined by the formula:

$$R_m^B = \frac{\int_{420}^{450} R(\lambda)d\lambda}{450-420}$$

wherein R(λ) represents the reflection factor at wavelength λ. $R_m^B$ can be measured for any angle of incidence θ, based on R(A) measured at the same angle of incidence.

The Applicant has surprisingly discovered that the multilayered antireflective coating according to the invention shows good compromise between low $R_v$ and high mean reflection factor both in the NIR region and in the harmful blue light region, while having a relatively thin physical thickness (equal or lower than 600 nm).

Indeed, as it will be shown in the examples below, the antireflective coating according to the invention enables to obtain a minimum achievable $R_v \leq 0.9\%$ and both a high mean reflection factor in NIR region (780-1400 nm) (≥20%) and high reflection in harmful blue blight region (420-450 nm) (≥7% at an angle of 15°).

In addition, the multilayered antireflective coating according to the invention presents the advantage of having a good robustness and aesthetic appearance. Herein, the term "robustness" of a lens is defined as the ability of this lens to resist change despite the variations induced by its manufacture process. These variations depend, for instance, on the type of substrate which is used, the setting of the manufacturing machine (temperature schedule, appropriate time, setting of the electron gun . . . ) and/or its usage mode, the replacement of said manufacturing machine by another one.

Preferably, the mean reflection factor in the near infrared (NIR) region $R_m^{NIR}$ of the antireflective coating is higher than or equal to 21%, in particular higher than or equal to 22%, and typically higher than or equal to 25%, in particular higher than or equal to 26%, or advantageously higher than or equal to 30%, at an angle of incidence lower than 35°.

As used herein, an interval higher than or equal to 20%, includes the following values and/or any intervals comprised between these values (limits included): 21, 22, 23, 24, 25, 26, 27, 28, 29, 30, 31, 32, 33, 34, etc.

In addition, the AR coating according to the invention is efficient to cut harmful blue light.

Especially, the mean reflection factor $R_m^B$ of blue light at a wavelength ranging from 420 to 450 nm has a first value $R_{m\,(<15°)}^B$ which is higher than or equal to 7.0% at an angle of incidence lower than 15°, preferably higher than or equal to 8.0%, more preferably higher than or equal to 9.0% and typically higher than or equal to 12.0%

As used herein, an interval higher than or equal to 7%, includes the following values and/or any intervals comprised between these values (limits included): 7; 7.5; 8; 8.5; 9; 9.5; 10; 10.5; 11; 11.5; 12; 12.5; 13; 13.5; 14; 14.5; 15; 15.5; 16; 16.5; etc.

According to another characteristic of the invention, the mean reflection factor $R_m^B$ of blue light at a wavelength ranging from 420 to 450 nm at an angle of incidence of 35° has a second value $R_{m\,(35°)}^B$ which fulfills following condition: $R_{m\,(<15°)}^B - R_{m\,(35°)}^B \geq 5\%$, preferably >5%, in particular ≥6%, more preferably ≥7% and typically ≥9%, such as for instance ≥10% or ≥11%.

As used herein, an interval higher than or equal to 5%, includes the following values and/or any intervals comprised between these values (limits included): 5; 5,5; 6; 6,5; 7; 7,5; 8; 8.5; 9; 9.5; 10; 10.5; 11; 11.5; 12; 12.5; etc.

This characteristic enables a lower reflection of blue light for light arriving on the back side of the lens with a high incidence angle (35°). The lens wearer is then protected more efficiently from blue light arriving from his back side.

As mentioned above, the multilayered antireflective coatings described in this application are also very efficient in the visible region.

Especially, the mean light reflection factor in the visible region $R_v$ of the antireflective coating is lower than or equal to 2.5%, preferably lower than or equal to 2.0%, more preferably lower than or equal to 1.5%, and is in general lower than or equal to 1.0%, such as lower than or equal to 0.5%, for at least an angle of incidence lower than 35°.

The "mean light reflection factor," noted $R_v$, is such as defined in the ISO 13666:1998 Standard, and measured in accordance with the ISO 8980-4, i.e. this is the weighted spectral reflection average over the whole visible spectrum between 380 and 780 nm. $R_v$ is usually measured for an angle of incidence lower than 17°, typically of 15°, but can be evaluated for any angle of incidence.

The multilayered antireflective coating of the invention comprises a stack of at least four layers made of dielectric materials having a high refractive index (HI) and a low refractive index (LI).

Typically, the total number of alternating HI and LI layers in the antireflective coating is higher than or equal to 4. Preferably, the total number of alternating HI and LI layers in the antireflective coating is lower than or equal to 8 and most preferably lower than or equal to 7, 6 or 5 layers.

As indicated above, the antireflective coating comprises at least two layers with a low refractive index (LI), at least two layers with a high refractive index layer (HI), one of the at least two HI layers is the layer which is the nearest from said substrate among said LI and HI layers.

According to an embodiment of the invention, said HI layer is in direct contact with the substrate, and according to another embodiment, said HI layer is not in direct contact with the substrate since this one may be coated with one or more functional coatings, such as described below.

In addition, in general, the outer layer of said antireflective coating which is the farthest from the substrate is an LI layer.

In particular, the LI layer of the AR coating which is the farthest from the substrate has a physical thickness ranging from 55 to 95 nm, preferably from 60 to 92 nm.

As used herein, a layer of the antireflective coating is defined as having a thickness higher than or equal to 1 nm. Thus, any layer having a thickness lower than 1 nm will not be considered when counting the number of layers in the antireflective coating. A sub-layer (such as described below) either is not considered when counting the number of layers of the antireflective coating.

Unless stated otherwise, all thicknesses disclosed in the present application relate to physical thicknesses.

HI layers and LI layers do not need to alternate with each other in the stack, although they also may, according to one embodiment of the invention. Thus, two HI layers (or more) may be deposited onto each other, as well as two LI layers (or more) may be deposited onto each other.

In general, the sum of physical thickness of all HI layers is ranging from 190 nm to 265 nm, preferably is ranging from 195 nm to 260 nm.

According to an embodiment of the invention, the AR coating includes alternating high refractive index and low refractive index materials. According to this embodiment, the number of layers is in general equal or higher than 5, preferably equal or higher than 6 and more preferably equal to 6.

According to these embodiment of the invention, the antireflective coating may comprise in the direction moving away from the substrate, the following layers which are in direct contact with each other: (1) an HI layer/(2) a LI layer/(3) an HI layer/(4) a LI layer, (5) an HI layer/and (6) a LI layer.

Especially, the (2) LI layer of said antireflective coating has a physical thickness ranging from 8 to 25 nm, preferably ranging from 10 to 20 nm.

Especially, the antireflective coating may comprise in the direction moving away from the substrate:
(1) an HI layer having a physical thickness ranging from 15 to 60 nm;
(2) a LI layer having a physical thickness ranging from 8 to 25 nm;
(3) an HI layer having a physical thickness ranging from 80 to 120 nm;
(4) a LI layer having a physical thickness ranging from 170 to 195 nm;
(5) an HI layer having a physical thickness ranging from 80 to 120 nm; and
(6) a LI layer having a physical thickness ranging from 70 to 95 nm.

According to a first characteristic of this embodiment, the antireflective coating may comprise in the direction moving away from the substrate:
(1) an HI layer having a physical thickness ranging from 30 to 60 nm;
(2) a LI layer having a physical thickness ranging from 8 to 20 nm;
(3) an HI layer having a physical thickness ranging from 80 to 110 nm;
(4) a LI layer having a physical thickness ranging from 175 to 190 nm;
(5) an HI layer having a physical thickness ranging from 80 to 120 nm; and
(6) a LI layer having a physical thickness ranging from 70 to 95 nm.

According to a second characteristic of this embodiment, the antireflective coating may comprise in the direction moving away from the substrate:
(1) an HI layer having a physical thickness ranging from 15 to 25 nm;
(2) a LI layer having a physical thickness ranging from 10 to 25 nm;
(3) an HI layer having a physical thickness ranging from 85 to 115 nm;
(4) a LI layer having a physical thickness ranging from 170 to 185 nm;
(5) an HI layer having a physical thickness ranging from 85 to 95 nm; and
(6) a LI layer having a physical thickness ranging from 75 to 90 nm.

According to a third characteristic of this embodiment, the antireflective coating may comprise in the direction moving away from the substrate:
(1) an HI layer having a physical thickness ranging from 20 to 25 nm;
(2) a LI layer having a physical thickness ranging from 15 to 20 nm;
(3) an HI layer having a physical thickness ranging from 100 to 120 nm;
(4) a LI layer having a physical thickness ranging from 175 to 187 nm;
(5) an HI layer having a physical thickness ranging from 90 to 100 nm; and
(6) a LI layer having a physical thickness ranging from 75 to 85 nm.

According to another embodiment of the invention, the AR coating includes alternating high refractive index and low refractive index materials, wherein at least one HI layer is made of a doublet, that is to say made from the deposition of a first high refractive index material on which a second high refractive index material is directly deposited, the first and the second high refractive index materials being, in general, different. According to this embodiment, the AR coating of the invention comprises one or two doublet HI layer(s). In general, the number of HI layers made of a doublet in an AR coating is preferably equal or lower than 4 and is typically equal to 2. Of course, a HI layers made of a doublet counts for one HI layer in the AR coating.

According to these embodiments of the invention, the antireflective coating may comprise in the direction moving away from the substrate, the following layers which are in direct contact with each other: (1) an HI layer/(2) a LI layer/(3) an HI layer/and (4) a LI layer.

Especially, according to this embodiment, the (1) HI layer, the (3) HI layer or both the (1) HI layer and the (3) HI layer of said antireflective coating is a doublet (bilayer) made of distinct metal oxides, preferably made of one layer of zirconia ($ZrO_2$) and one layer of tantalum pentoxide ($Ta_2O_5$), in any order.

For instance, the antireflective coating may comprise in the direction moving away from the substrate:
(1) an HI layer having a physical thickness ranging from 130 to 150 nm;
(2) a LI layer having a physical thickness ranging from 180 to 205 nm;
(3) an HI layer having a physical thickness ranging from 90 to 120 nm; and
(4) a LI layer having a physical thickness ranging from 60 to 90 nm.

According to another embodiment of the invention, the AR coating includes alternating high refractive index and low refractive index materials, wherein at least one HI layer is made of a triplet, that is to say made from the deposition of a first high refractive index material on which a second high refractive index material is directly deposited, on which a third high refractive index material is directly deposited. The first, the second and the third high refractive index materials may be different. In some particular embodiment, the triplet is composed of a central layer made of a first high refractive index material surrounded on both sides by two layers made of the same second high refractive index material, the first and second high refractive index material being different. In specific embodiments, the refractive index of the central layer is higher than the refractive index of the two surrounding layers, made from the same or different high refractive index materials. According to these embodiments, the AR coating of the invention comprises one or two triplet HI layer(s). In general, the number of HI layers made of a triplet in an AR coating is preferably equal or lower than 4 and is typically equal to 2. Of course, as previously, a triplet HI layer counts for one HI layer in the alternating HI and LI layers stack of an AR coating.

According to another embodiment of the invention, the AR coating includes alternating high refractive index and low refractive index materials, wherein at least one HI layer is made of a doublet and at least one HI layer is made of a triplet.

According to these embodiments of the invention, the antireflective coating may comprise in the direction moving away from the substrate, the following layers which are in direct contact with each other: (1) an HI layer/(2) a LI layer/(3) an HI layer/and (4) a LI layer.

Especially, according to this embodiment, the (1) HI layer, the (3) HI layer or both the (1) HI layer and the (3) HI layer of said antireflective coating is a triplet (trilayer) made of metal oxides selected from zirconia ($ZrO_2$), tantalum pentoxide ($Ta_2O_5$), hafnium dioxide ($HfO_2$), niobium oxide ($Nb_2O_5$) and, titanium dioxide ($TiO_2$). Central layer is preferably selected from materials having a very high index, in particular tantalum pentoxide ($Ta_2O_5$), niobium oxide ($Nb_2O_5$) and titanium dioxide ($TiO_2$).

For instance, the antireflective coating may comprise in the direction moving away from the substrate:

(1) an HI layer having a physical thickness ranging from 130 to 160 nm;
(2) a LI layer having a physical thickness ranging from 140 to 215 nm;
(3) an HI layer having a physical thickness ranging from 90 to 130 nm; and
(4) a LI layer having a physical thickness ranging from 60 to 90 nm.

In the present application, a layer of the antireflective coating is said to be a layer with a high refractive index (HI) when its refractive index is higher than or equal to 1.55, preferably higher than or equal to 1.6, even more preferably higher than or equal to 1.90, such as 1.95 even more preferably higher than or equal to 2.00, such as 2.14.

A layer of the antireflective coating is said to be a low refractive index layer (LI) when its refractive index is lower than 1.55, preferably lower than or equal to 1.50, more preferably lower than or equal to 1.48. Said LI layer preferably has a refractive index higher than 1.1.

Unless otherwise specified, the refractive indexes referred to in the present application are expressed at 25° C. at a wavelength of 550 nm.

The HI layer is a traditional high refractive index layer that is well known in the art. It generally comprises one or more metal oxides such as, without limitation, zirconia ($ZrO_2$), alumina ($Al_2O_3$), tantalum pentoxide ($Ta_2O_5$), praseodymium oxide ($Pr_2O_3$), praseodymium titanate ($PrTiO_3$), lanthanum oxide ($La_2O_3$), yttrium oxide ($Y_2O_3$), niobium oxide ($Nb_2O_5$), titanium dioxide ($TiO_2$) and mixtures thereof. The preferred materials include zirconia ($ZrO_2$), tantalum pentoxide ($Ta_2O_5$). Optionally, the HI layers may further contain silica or other materials with a low refractive index, provided they have a refractive index higher than or equal to 1.6 as indicated hereabove. According to a characteristic of the invention, the HI layer does not comprise titanium dioxide ($TiO_2$).

The LI layer is also well known and may comprise, without limitation, $MgF_2$, $SiO_2$, a mixture of silica and alumina, especially silica doped with alumina (the latter contributing to increase the antireflective coating thermal resistance), or a mixture thereof. The LI layer is preferably a layer comprising at least 80% by weight of silica, more preferably at least 90% by weight of silica, relative to the layer total weight, and even more preferably consists in a silica layer ($SiO_2$). Optionally, the LI layers may further contain materials with a high refractive index or very high refractive index, provided the refractive index of the resulting layer is lower than to 1.6.

When a LI layer comprising a mixture of $SiO_2$ and $Al_2O_3$ is used, it preferably comprises from 1 to 10%, more preferably from 1 to 8% and even more preferably from 1 to 5% by weight of $Al_2O_3$ relative to the $SiO_2+Al_2O_3$ total weight in such layer.

For example, $SiO_2$ doped with 4% $Al_2O_3$ by weight, or less, or $SiO_2$ doped with 8% $Al_2O_3$ may be employed. $SiO_2/Al_2O_3$ mixtures, that are available on the market may be used, such as LIMA® marketed by the Umicore Materials AG company (refractive index n=1.48-1.50 at 550 nm), or L5® marketed by the Merck KGaA company (refractive index n=1.48 at 500 nm).

Generally, the antireflective coating total thickness is lower than or equal to 600 nm, more preferably lower than or equal to 550 nm and even more preferably lower than or equal to 525 nm. The antireflective coating total thickness is generally higher than 100 nm, preferably higher than 150 nm. Typically, the physical thickness of said antireflective coating is ranging from 190 to 525 nm.

The present invention provides hence an antireflective coating with an improved conception, comprising a relatively thin stack made of layers, the thicknesses and materials of which have been selected so as to obtain satisfactory antireflective performances and a good compromise between high reflection in the blue light region and the NIR region and low reflection in the visible region, while having robustness properties.

In one embodiment of the present invention, the antireflective coating may be deposited onto a sub-layer. It should be noted that such sub-layer does not belong to the antireflective coating.

As used herein, a sub-layer or adhesion layer is intended to mean a relatively thick coating, used in order to improve the mechanical properties such as the abrasion resistance and/or the scratch resistance of said coating and/or so as to reinforce its adhesion to the substrate or to the underlying coating.

Because of its relatively high thickness, the sub-layer does not generally take part to the antireflective optical activity, especially when it has a refractive index close to that of the underlying substrate (which is generally the anti-abrasion and anti-scratch coating or the bare substrate).

The sub-layer should have a thickness that is sufficient for promoting the abrasion resistance of the antireflective coating, but preferably not to such an extent that a light absorption could be caused, which, depending on the sub-layer nature, could significantly reduce the relative transmission factor $\tau_v$. Its thickness is generally lower than 300 nm, more preferably lower than 200 nm, and is generally higher than 90 nm, more preferably higher than 100 nm.

The sub-layer preferably comprises a $SiO_2$-based layer, this layer comprising preferably at least 80% by weight of silica, more preferably at least 90% by weight of silica, relative to the layer total weight, and even more preferably consists in a silica layer. The thickness of such silica-based layer is generally lower than 300 nm, more preferably lower than 200 nm, and is generally higher than 90 nm, more preferably higher than 100 nm.

In another embodiment, this $SiO_2$-based layer is a silica layer doped with alumina, in amounts such as defined hereabove, preferably consists in a silica layer doped with alumina.

In a particular embodiment, the sub-layer consists in a $SiO_2$ layer.

A sub-layer of the monolayer type will be preferably used. However, the sub-layer may be laminated (multilayered), especially when the sub-layer and the underlying substrate have a substantially different refractive index. This applies especially when the underlying substrate, has a high refractive index, i.e. a refractive index higher than or equal to 1.55, preferably higher than or equal to 1.57.

In this case, the sub-layer may comprise, in addition to a 90-300 nm-thick layer, called the main layer, preferably at most three additional layers, more preferably at most two additional layers, interleaved between the optionally coated substrate and such 90-300 nm-thick layer, which is generally a silica-based layer. These additional layers are preferably thin layers, which function aims at limiting the reflections at the sub-layer/underlying coating interface or sub-layer/substrate interface, as appropriate.

A multilayered sub-layer preferably comprises, in addition to the main layer, a layer with a high refractive index and with a thickness lower than or equal to 80 nm, more preferably lower than or equal to 50 nm and most preferably lower than or equal to 30 nm. Such layer with a high refractive index is directly contacting the substrate with a high refractive index or the underlying coating with a high refractive index, as appropriate. Of course, this embodiment may be used even if the substrate (or the underlying coating) has a refractive index lower than 1.55.

As an alternative, the sub-layer comprises, in addition to the main layer and to the previously mentioned layer with a high refractive index, a layer made of a $SiO_2$-based material (that is to say comprising preferably at least 80% by weight of silica) with a refractive index lower than or equal to 1.55, preferably lower than or equal to 1.52, more preferably lower than or equal to 1.50, and with a thickness lower than or equal to 80 nm, more preferably lower than or equal to 50 nm and even more preferably lower than or equal to 30 nm, onto which is deposited said layer with a high refractive index. Typically, in this instance, the sub-layer comprises, deposited in this order onto the optionally coated substrate, a 25 nm-thick $SiO_2$ layer, a 10 nm-thick $ZrO_2$ or $Ta_2O_5$ layer and thereafter the sub-layer main layer.

According to an embodiment, the antireflective coating is not deposited onto a sub-layer such as described above.

The optical article of the invention may be made antistatic, that is to say not to retain and/or develop a substantial static charge, by incorporating at least one electrically conductive layer into the stack present on the surface of the article.

The ability for a glass to evacuate a static charge obtained after rubbing with a piece of cloth or using any other procedure to generate a static charge (charge applied by corona . . . ) may be quantified by measuring the time it takes for said charge to dissipate. Thus, antistatic glasses have a discharge time of about a few hundred milliseconds, preferably 500 ms or less, whereas it is of about several tens of seconds for a static glass. In the present application, discharge times are measured according to the method exposed in the French application FR 2 943 798.

As used herein, an "electrically conductive layer" or an "antistatic layer" is intended to mean a layer which, due to its presence on the surface of a non-antistatic substrate (i.e. having a discharge time higher than 500 ms), enables to have a discharge time of 500 ms or less after a static charge has been applied onto the surface thereof.

The electrically conductive layer may be located on various places in the stack, generally in or in contact with the antireflective coating, provided the antireflective properties thereof are not affected. It is preferably located between two layers of the antireflective coating, and/or is adjacent to a layer with a high refractive index of such antireflective coating. Preferably, the electrically conductive layer is located immediately under a layer with a low refractive index of the antireflective coating, most preferably is the penultimate layer of the antireflective coating by being located immediately under the silica-based outer layer of the antireflective coating.

The electrically conductive layer should be thin enough not to alter the transparency of the antireflective coating. The electrically conductive layer is preferably made from an electrically conductive and highly transparent material, generally an optionally doped metal oxide. In this case, the thickness thereof preferably varies from 1 to 15 nm, more preferably from 1 to 10 nm. Preferably, the electrically conductive layer comprises an optionally doped metal oxide, selected from indium, tin, zinc oxides and mixtures thereof. Tin-indium oxide ($In_2O_3$:Sn, tin-doped indium oxide), aluminum-doped zinc oxide (ZnO:Al), indium oxide ($In_2O_3$) and tin oxide ($SnO_2$) are preferred. In a most preferred embodiment, the electrically conductive and optically transparent layer is a tin-indium oxide layer, noted ITO layer or a tin oxide layer.

Generally, the electrically conductive layer contributes, within the stack, but in a limited manner, because of its low thickness, to obtain antireflective properties and represents a layer with a high refractive index in the antireflective coating. This is the case for those layers made from an electrically conductive and highly transparent material such as ITO layers.

The antireflective coating does not comprise any layer with a thickness higher than or equal to 20 nm, preferably higher than 15 nm, based on indium oxide. When a plurality of indium oxide-based layers are present in the antireflective coating, their total thickness is preferably lower than 20 nm, more preferably lower than 15 nm. As used herein, an indium oxide-based layer is intended to mean a layer comprising at least 50% by weight of indium oxide relative to the layer total weight.

According to a preferred embodiment, the antireflective coating does not comprise any layer with a thickness higher than or equal to 20 nm, preferably higher than 15 nm, comprising indium oxide, tin oxide or zinc oxide. When a plurality of layers comprising indium oxide, tin oxide or zinc oxide are present in the antireflective coating, their total thickness is preferably lower than 20 nm, more preferably lower than 15 nm.

The various layers of the antireflective coating and the optional sub-layer are preferably deposited by chemical vapor deposition, under vacuum, according to any of the following methods: i) by optionally ion-beam assisted, evaporation; ii) by ion-beam sputtering; iii) by cathode sputtering; iv) by plasma-assisted chemical vapor deposition. These various methods are described in the following references "Thin Film Processes" and "Thin Film Processes II," Vossen & Kern, Ed., Academic Press, 1978 and 1991, respectively. A particularly recommended method is the evaporation under vacuum.

Preferably, the deposition of each of the layers of the antireflective coating and of the optional sub-layer is conducted by evaporation under vacuum.

Generally, the optical article is an ophthalmic lens, especially a spectacle lens.

The antireflective coatings of the front face and of the rear face may be the same or different.

In an embodiment of the invention, the front face and the rear face of the optical article of the invention are coated with the antireflective coating described above. In another embodiment, the rear face of the optical article of the invention is coated with a conventional antireflective coating having a mean reflection factor in UV range (as defined in WO2012076714) $R_{uv} \leq 10\%$, preferably $R_{uv} \leq 5\%$, different from the one provided on its front face which is according to the invention.

Generally, the front and/or rear main face of the substrate onto which an antireflective coating will be deposited is coated with an impact-resistant primer layer, with an anti-abrasion and/or anti-scratch coating, or with an impact-resistant primer layer coated with an anti-abrasion and/or anti-scratch coating.

The antireflective coating of the invention is preferably deposited onto an anti-abrasion and/or anti-scratch coating. The anti-abrasion and/or scratch-resistant coating may be any layer traditionally used as an anti-abrasion and/or anti-scratch coating in the field of ophthalmic lenses.

The anti-abrasion and/or scratch-resistant coatings are preferably hard coatings based on poly(meth)acrylates or silanes, generally comprising one or more mineral fillers intended to increase the hardness and/or the refractive index of the coating once cured.

Hard anti-abrasion and/or scratch-resistant coatings are preferably prepared from compositions comprising at least one alkoxysilane and/or a hydrolyzate thereof, obtained for example through hydrolysis with a hydrochloric acid solution and optionally condensation and/or curing catalysts.

Suitable coatings, that are recommended for the present invention include coatings based on epoxysilane hydrolyzates such as those described in the patents FR 2 702 486 (EP 0 614 957), U.S. Pat. Nos. 4,211,823 and 5,015,523.

The anti-abrasion and/or scratch-resistant coating composition may be deposited onto the main face of the substrate by dip- or spin-coating. It is then cured by a suitable method (preferably using heat or ultraviolet radiation).

The thickness of the anti-abrasion and/or scratch-resistant coating does generally vary from 2 to 10 µm, preferably from 3 to 5 µm.

Prior to depositing the abrasion-resistant coating and/or the scratch-resistant coating, it is possible to apply onto the substrate a primer coating to improve the impact resistance and/or the adhesion of the subsequent layers in the final product. This coating may be any impact-resistant primer layer traditionally used for articles in a transparent polymer material, such as ophthalmic lenses.

Preferred primer compositions are compositions based on polyurethanes and compositions based on latexes, especially polyurethane type latexes optionally containing polyester units.

Such primer compositions may be deposited onto the article faces by dip- or spin-coating, thereafter be dried at a temperature of at least 70° C. and up to 100° C., preferably of about 90° C., for a time period ranging from 2 minuses to 2 hours, generally of about 15 minutes, to form primer layers having thicknesses, after curing, of from 0.2 to 2.5 µm, preferably of from 0.5 to 1.5 µm.

The optical article according to the invention may also comprise coatings formed on the antireflective coating and capable of modifying the surface properties thereof, such as hydrophobic and/or oleophobic coatings (antifouling top coat). These coatings are preferably deposited onto the outer layer of the antireflective coating. As a rule, their thickness is lower than or equal to 10 nm, does preferably range from 1 to 10 nm, more preferably from 1 to 5 nm.

Instead of the hydrophobic coating, a hydrophilic coating may be used which provides antifog properties, or an antifog precursor coating which provides antifog properties when associated with a surfactant. Examples of such antifog precursor coatings are described in the patent application WO 2011/080472.

Typically, an optical article according to the invention comprises a substrate that is successively coated on its rear face with an impact-resistant primer layer, an anti-abrasion and scratch-resistant layer, an anti-UV, antireflective coating, and with a hydrophobic and/or oleophobic coating, or with a hydrophilic coating which provides antifog properties, or an antifog precursor coating. The optical article according to the invention is preferably an ophthalmic lens for spectacles (spectacle lens), or a blank for ophthalmic lenses. The lens may be a polarized lens, a photochromic lens or a solar lens, which may be tinted or not, be corrective, or not.

The front face of the substrate of the optical article may be successively coated with an impact-resistant primer layer, an abrasion-resistant layer and/or a scratch-resistant layer, an antireflective coating according to the invention, and with a hydrophobic and/or oleophobic coating.

In one embodiment, the optical article according to the invention does not absorb in the visible or not much, which means, in the context of the present application, that its transmission factor in the visible range $\tau_V$ also called relative transmission factor in the visible range, is higher than 90%, more preferably higher than 95%, even more preferably higher than 96% and most preferably higher than 97%.

The factor $\tau_V$ should be understood as defined by the international normalized definition (ISO 13666:1998 Standard) and is measured in accordance with the ISO 8980-3 Standard. It is defined in the wavelength range of from 380 to 780 nm.

Preferably, the multilayered antireflective coating has a Chroma C* which is higher or equal to 20, preferably higher or equal to 25, typically higher or equal to 30 according to the international colorimetric system CIE L*a*b* for an angle of incidence θ of less than or equal to 35°, preferably lower than or equal 30°, in particular lower than or equal 25° and typically lower than or equal 20°.

Hence, the antireflective coating of the present invention shows a constant perceived residual color variation according to the angle of incidence θ. Indeed, the inventors observed that the ophthalmic lenses according to the invention have a great colorimetric reliability, i.e. the hue angle h and the chroma C* were particularly stable over time and iterations ($\sigma h° \leq 6.8$ and $\sigma C* \leq 10.0$, where σ denotes the standard deviation of hue or chroma for a Gaussian distribution of thicknesses for all layers of antireflective coatings).

The following examples illustrate the present invention in a more detailed, but non-limiting manner.

EXAMPLES

1. General Procedures

The optical articles used in the examples comprise a lens substrate, having a 65 mm diameter, a refractive index of 1.50 (ORMA® lens from ESSILOR) or 1.60 (lenses based on MR-8® from MITSUI), and a power of −2.00 diopters and a center thickness of 1.2 mm, coated on its front and rear faces with the following anti-abrasion and scratch-resistant coating.

The anti-abrasion and scratch-resistant coating disclosed in Example 3 of the patent EP 0 614 957 (refractive index equal to 1.47 and thickness of 3.5 μm), based on a hydrolyzate composed of GLYMO and DMDES, of colloidal silica and aluminium acetylacetonate is deposited on the substrate.

Said anti-abrasion and scratch-resistant coating was obtained by depositing and hardening a composition comprising by weight, 224 parts of GLYMO, 80.5 parts of HCl 0.1 N, 120 parts of DMDES, 718 parts of 30% by weight colloidal silica in methanol, 15 parts of aluminium acetylacetonate and 44 parts of ethylcellosolve. The composition also contained 0.1% of surfactant FLUORAD™ FC-430® manufactured by 3M, by weight relative to the composition total weight.

The anti-abrasion and scratch-resistant coating described above has a refractive index about 1.5 (hereinafter HC1.5) and is used for substrates having a refractive index of 1.5.

For substrates having a refractive index of 1.6, titanium dioxide particles are added in anti-abrasion and scratch-resistant coating described above to match a refractive index of 1.6 (hereinafter HC1.6).

The layers of the antireflective coating were deposited without heating the substrates by evaporation under vacuum (evaporation source: electron gun).

The deposition frame is a Leybold 1104 machine fitted with an electron gun (ESV14 (8 kV)) for evaporating oxides, and provided with an ion gun (Commonwealth Mark II) for the preliminary phase to prepare the surface of the substrate using argon ions (IPC).

The thickness of the layers was controlled by means of a quartz microbalance. The spectral measurements were effected on a variable incidence-spectrophotometer Perkin-Elmer Lambda 850 with an URA accessory (Universal Reflectance Accessory).

2. Test Procedure

The method for making optical articles comprises the step of introducing the substrate, coated with the anti-abrasion and scratch-resistant coating, into a vacuum deposition chamber, a step of pumping until a high-vacuum is obtained, a step of activating the front face of the substrate by means of an argon ion beam (anode current: 1 A, anode voltage: 100 V, neutralization current: 130 mA), turning the ion irradiation off, forming the various layers of the antireflective coating by successive evaporations on front face and last a ventilation step.

3. Results

Figure 2:
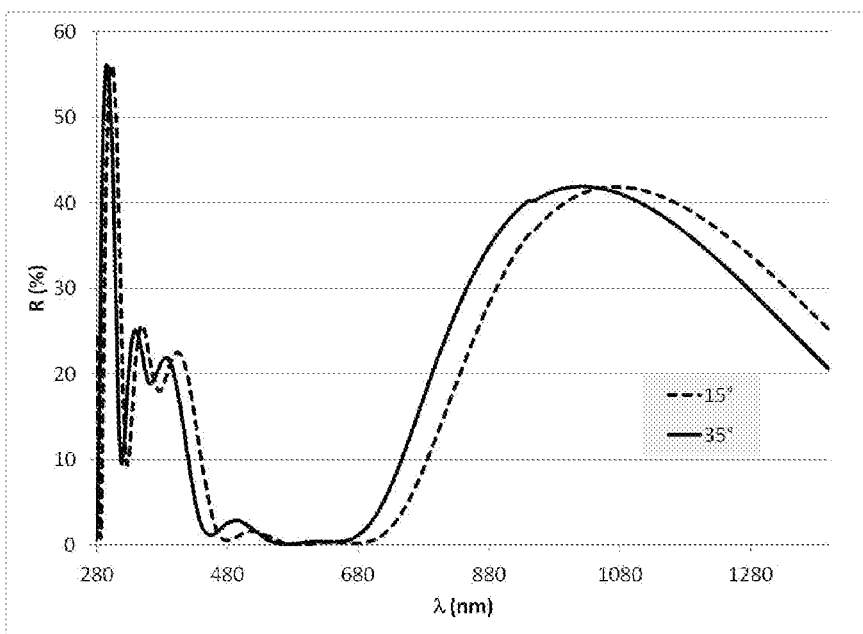
Figure 3:
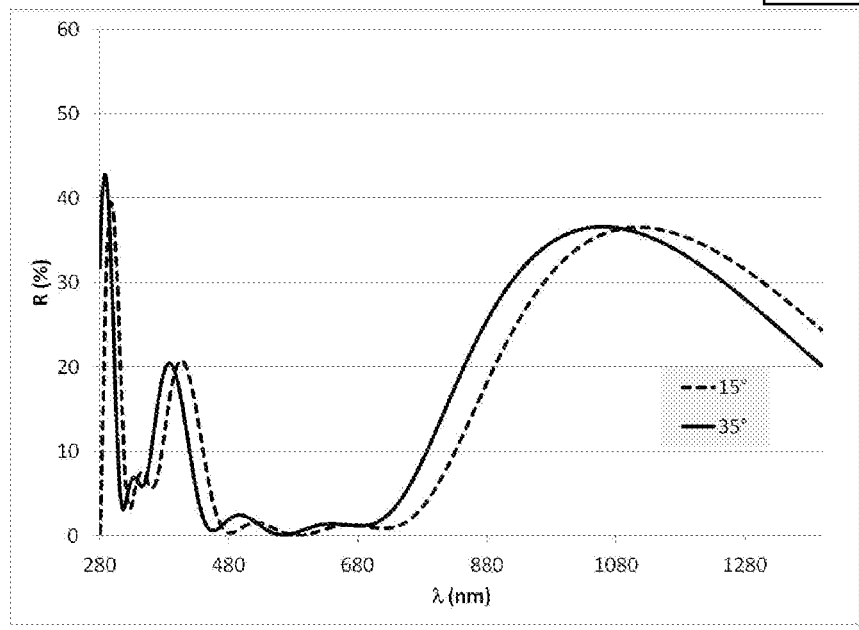
Figure 4:
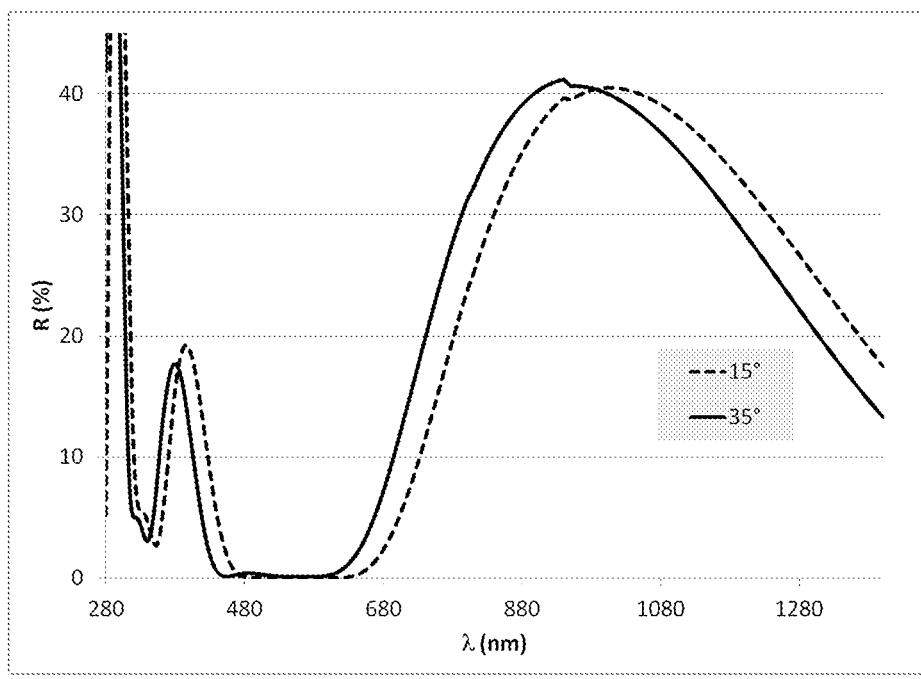
Figure 5:
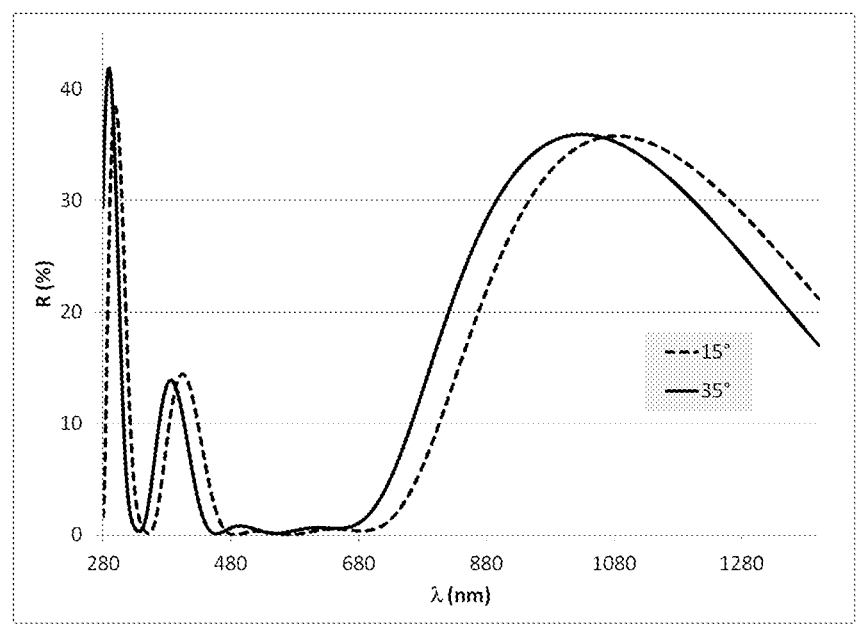
Figure 6:
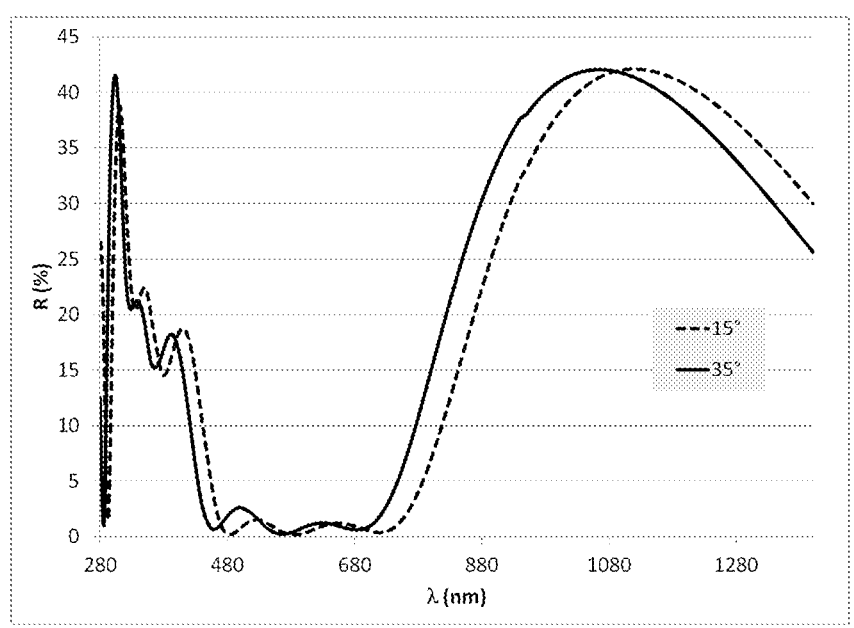
Figure 7:
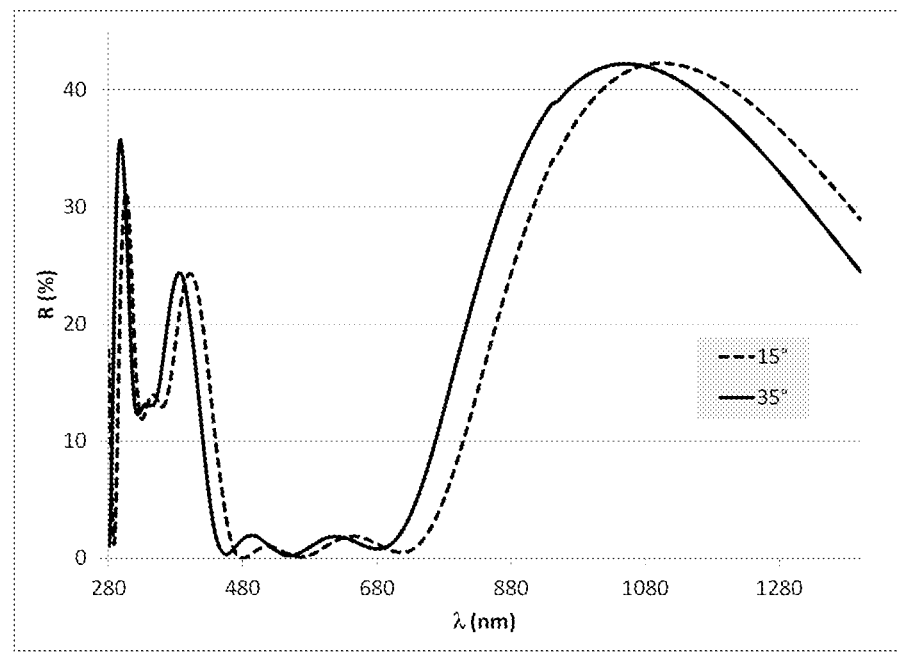
Figure 8:
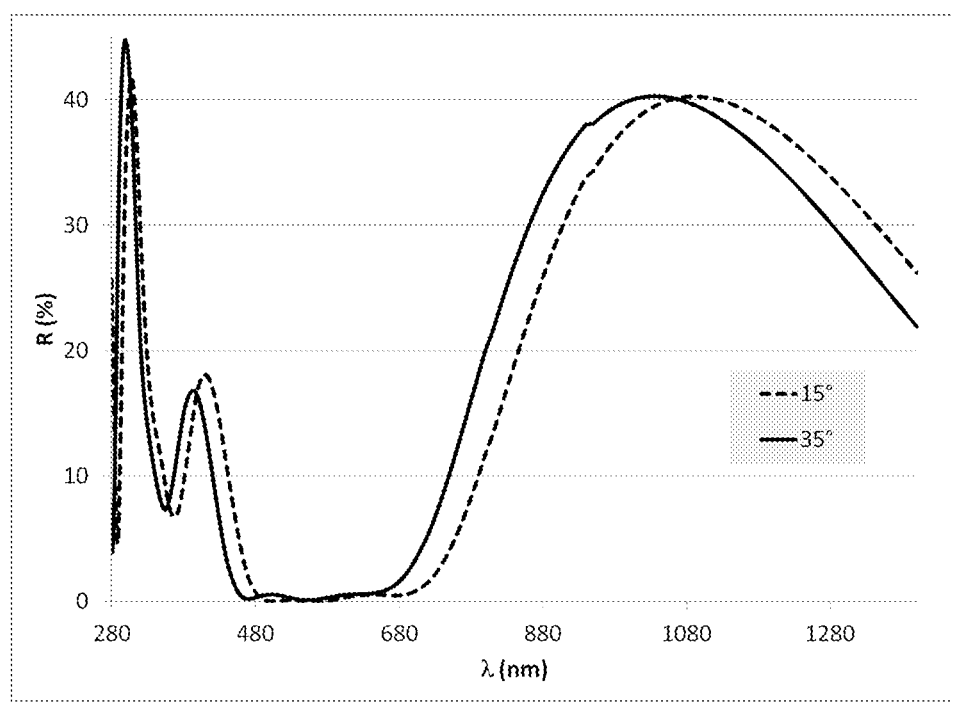
Figure 9:
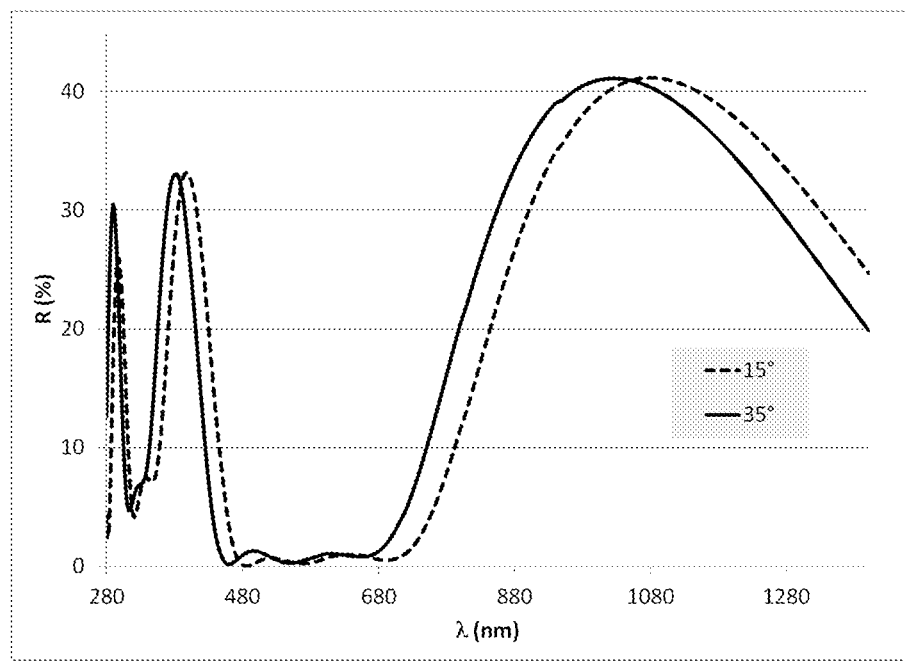
Figure 10:
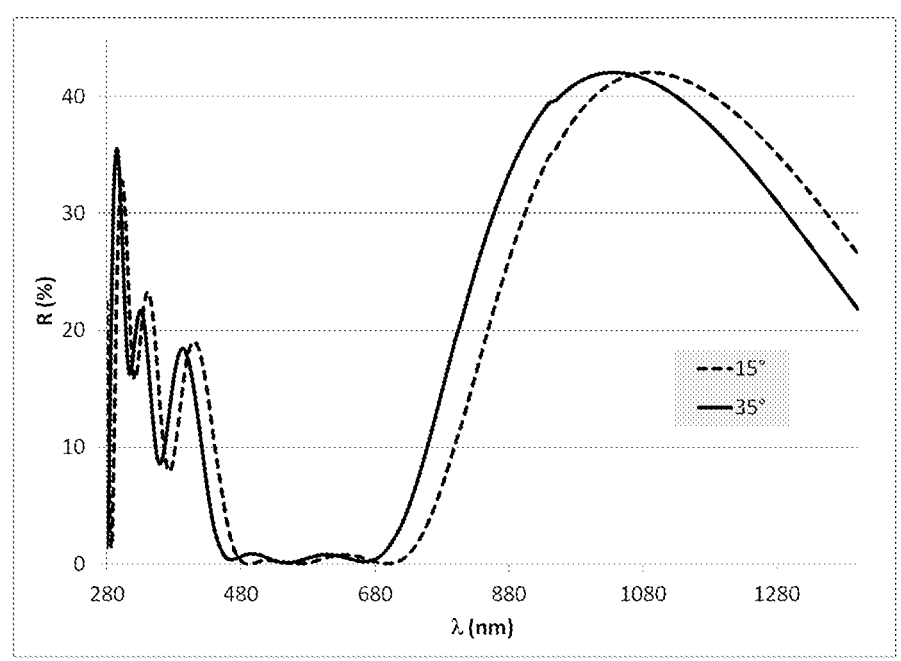
Figure 11:
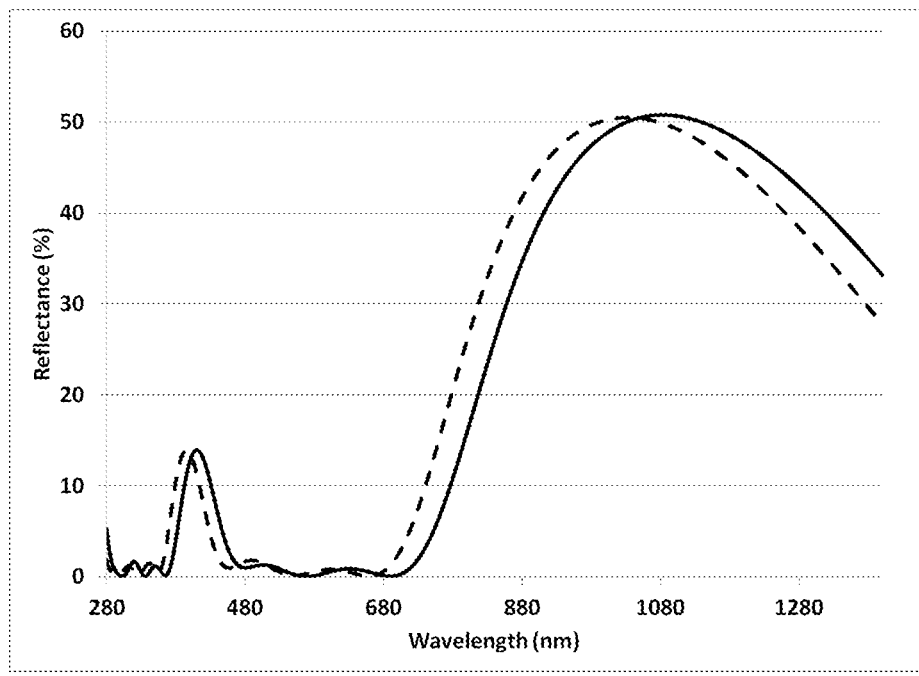
Figure 12:
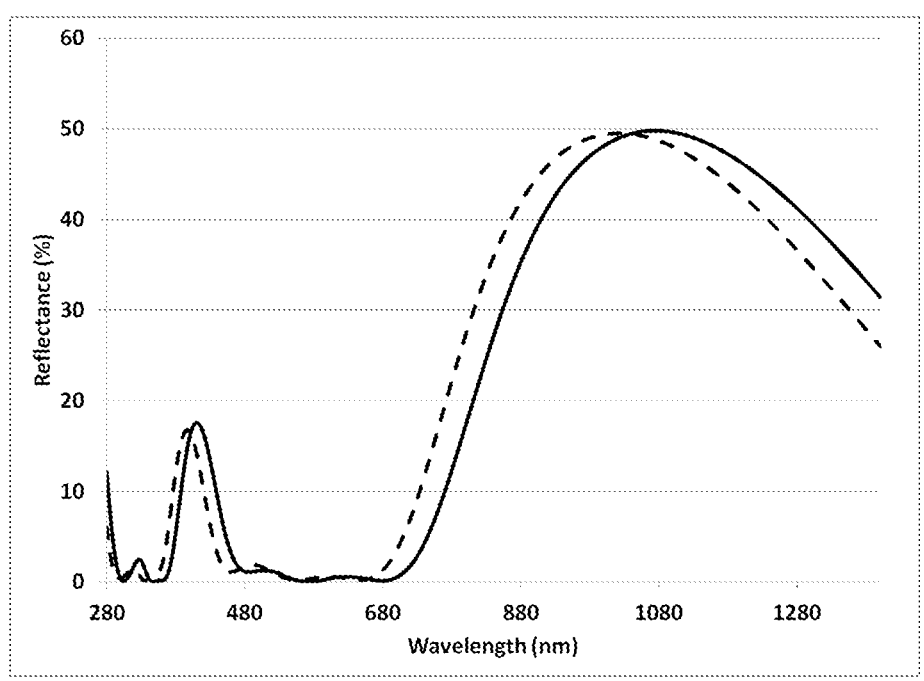

The structural characteristics and the optical performances of the ophthalmic lenses obtained in the Examples 1 to 23 are detailed hereunder. The reflection graphs between 280 and 780 nm of some articles prepared are illustrated on FIGS. 1 to 10, with angles of incidence of 15° and 35°.

The optical values are those of the front face. Factors $R_v$, $R_m^{NIR}$, $R_m^B$, chroma ($C^*$) and hue (h) of reflected light are provided for an angle of incidence of 15° or 35°, a standard illuminant D65 and a standard observer (angle 10°).

Examples 1 to 8 correspond to a first embodiment wherein the AR coating comprises 6 layers; examples 9 to 12 correspond to a second embodiment wherein the AR coating comprises 4 layers, examples 13 to 18 correspond to a third embodiment wherein the AR coating comprises 4 layers, the first HI layer the nearest from the substrate being a doublet; examples 19 to 23 correspond to a fourth embodiment wherein the AR coating comprises 4 layers, the first and the second HI layers being a doublet and examples 24 to 33 correspond to a fifth embodiment wherein the AR coating comprises 4 layers, the first and the second HI layers being a triplet.

| | Example 1 | | Example 2 | | Example 3 | |
|---|---|---|---|---|---|---|
| | Substrate + HC1.6 | | Substrate + HC1.5 | | Substrate + HC1.6 | |
| $Ta_2O_5$ | 44.60 nm | $Ta_2O_5$ | 36.44 nm | $ZrO_2$ | 54.76 nm |
| $SiO_2$ | 10.82 nm | $SiO_2$ | 14.56 nm | $SiO_2$ | 9.83 nm |
| $Ta_2O_5$ | 79.91 nm | $Ta_2O_5$ | 84.61 nm | $ZrO_2$ | 85.92 nm |
| $SiO_2$ | 181.06 nm | $SiO_2$ | 178.85 nm | $SiO_2$ | 186.89 nm |
| $Ta_2O_5$ | 101.53 nm | $Ta_2O_5$ | 101.06 nm | $ZrO_2$ | 102.40 nm |
| $SiO_2$ | 79.51 nm | $SiO_2$ | 80.66 nm | $SiO_2$ | 80.25 nm |
| Air | | Air | | Air | |
| $R_v$ (15°) | 0.77% | $R_v$ (15°) | 0.76% | $R_v$ (15°) | 0.80% |
| $R_m^{NIR}$ (15°) | 32.0% | $R_m^{NIR}$ (15°) | 33.5% | $R_m^{NIR}$ (15°) | 26.0% |
| $R_m^B$ (<15°) | 12.5% | $R_m^B$ (<15°) | 12.5% | $R_m^B$ (<15°) | 12.5% |
| $R_m^B$ (35°) | 4.5% | $R_m^B$ (35°) | 4.4% | $R_m^B$ (35°) | 4.2% |
| h* | 304 | h* | 304 | h* | 305 |
| σh* | 6.4 | σh* | 6.8 | σh* | 4.5 |
| C* | 50 | C* | 50 | C* | 50 |
| σC* | 9.6 | σC* | 10.0 | σC* | 8.5 |

| | Example 4 | | Example 5 | | Example 6 | |
|---|---|---|---|---|---|---|
| | Substrate + HC1.5 | | Substrate + HC1.6 | | Substrate + HC1.6 | |
| $ZrO_2$ | 46.46 nm | $Ta_2O_5$ | 18.42 nm | $Ta_2O_5$ | 21.12 nm |
| $SiO_2$ | 10.24 nm | $SiO_2$ | 16.09 nm | $SiO_2$ | 20.91 nm |
| $ZrO_2$ | 95.47 nm | $Ta_2O_5$ | 108.83 nm | $Ta_2O_5$ | 90.97 nm |
| $SiO_2$ | 188.79 nm | $SiO_2$ | 177.50 nm | $SiO_2$ | 173.23 nm |

-continued

| | | | | | |
|---|---|---|---|---|---|
| $ZrO_2$ | 104.89 nm | $Ta_2O_5$ | 93.00 nm | $Ta_2O_5$ | 87.91 nm |
| $SiO_2$ | 78.21 nm | $SiO_2$ | 81.98 nm | $SiO_2$ | 82.64 nm |
| Air | | Air | | Air | |
| $R_v$ (15°) | 0.82% | $R_v$ (15°) | 0.12% | $R_v$ (15°) | 0.10% |
| $R_m^{NIR}$ (15°) | 28.0% | $R_m^{NIR}$ (15°) | 32.3% | $R_m^{NIR}$ (15°) | 32.3% |
| $R_m^B$ (<15°) | 12.5% | $R_m^B$ (<15°) | 7.4% | $R_m^B$ (<15°) | 7.3% |
| $R_m^B$ (35°) | 4.2% | $R_m^B$ (35°) | 2.2% | $R_m^B$ (35°) | 1.5% |
| h* | 306 | h* | 309 | h* | 310 |
| σh* | 5.6 | σh* | 2.7 | σh* | 1.5 |
| C* | 50 | C* | 50 | C* | 50 |
| σC* | 9.1 | σC* | 7.4 | σC* | 7.7 |

| Example 7 | | Example 8 | | Example 9 | |
|---|---|---|---|---|---|
| Substrate + HC1.5 | | Substrate + HC1.6 | | Substrate + HC1.6 | |
| $ZrO_2$ | 22.33 nm | $ZrO_2$ | 22.51 nm | $Ta_2O_5$ | 137.91 nm |
| $SiO_2$ | 13.58 nm | $SiO_2$ | 17.29 nm | $SiO_2$ | 185.71 nm |
| $ZrO_2$ | 114.89 nm | $ZrO_2$ | 114.53 nm | $Ta_2O_5$ | 103.61 nm |
| $SiO_2$ | 181.97 nm | $SiO_2$ | 182.79 nm | $SiO_2$ | 81.24 nm |
| $ZrO_2$ | 90.20 nm | $ZrO_2$ | 97.93 nm | | |
| $SiO_2$ | 85.13 nm | $SiO_2$ | 82.59 nm | | |
| Air | | Air | | Air | |
| $R_v$ (15°) | 0.15% | $R_v$ (15°) | 0.26% | $R_v$ (15°) | 0.87% |
| $R_m^{NIR}$ (15°) | 25.9% | $R_m^{NIR}$ (15°) | 28.0% | $R_m^{NIR}$ (15°) | 33.0% |
| $R_m^B$ (<15°) | 7.4% | $R_m^B$ (<15°) | 8.0% | $R_m^B$ (<15°) | 12.5% |
| $R_m^B$ (35°) | 2.1% | $R_m^B$ (35°) | 2.3% | $R_m^B$ (35°) | 5.0% |
| h* | 309 | h* | 310 | h* | 307 |
| σh* | 2.4 | σh* | 3.4 | σh* | 6.4 |
| C* | 50 | C* | 50 | C* | 50 |
| σC* | 6.0 | σC* | 7.5 | σC* | 9.6 |

It could be observed from these examples 1 to 8, that the AR coatings according to the invention and comprising 6 alternating layers of HI layers and LI layers enable to obtain high reflection in the NIR region: ≥25% at an incidence angle of 15°, high reflection in the harmful blue light region: ≥7% at an incidence angle of 15° even ≥12.5% for examples 1 to 4, while the reflection in the visible region is very low: ≤0.82% at an incidence angle of 15° even ≤0.15% for examples 5 to 7.

AR coatings comprising tantalum pentoxide (Ex 1, 2, 5 and 6) show also a higher reflection in NIR region (≥30% at an incidence angle of 15°) as compared to AR coatings comprising zirconia.

| Example 10 | | Example 11 | | Example 12 | |
|---|---|---|---|---|---|
| Substrate + HC1.6 | | Substrate + HC1.6 | | Substrate + HC1.6 | |
| $Ta_2O_5$ | 131.72 | $ZrO_2$ | 147.52 nm | $ZrO_2$ | 143.71 nm |
| $SiO_2$ | 188.50 | $SiO_2$ | 187.17 nm | $SiO_2$ | 199.33 nm |
| $Ta_2O_5$ | 103.77 | $ZrO_2$ | 98.61 nm | $ZrO_2$ | 113.22 nm |
| $SiO_2$ | 79.10 | $SiO_2$ | 90.04 nm | $SiO_2$ | 80.53 nm |
| Air | | Air | | Air | |
| $R_v$ (15°) | 0.67% | $R_v$ (15°) | 0.82% | $R_v$ (15°) | 0.97% |
| $R_m^{NIR}$ (15°) | 33.4% | $R_m^{NIR}$ (15°) | 26.0% | $R_m^{NIR}$ (15°) | 28.0% |
| $R_m^B$ (<15°) | 10.0% | $R_m^B$ (<15°) | 12.5% | $R_m^B$ (<15°) | 12.5% |
| $R_m^B$ (35°) | 3.2% | $R_m^B$ (35°) | 4.3% | $R_m^B$ (35°) | 5.2% |
| h* | 313 | h* | 306 | h* | 309 |
| σh* | 4.6 | σh* | 4.8 | σh* | 3.5 |
| C* | 50 | C* | 50 | C* | 50 |
| σC* | 8.7 | σC* | 8.6 | σC* | 7.9 |

| Example 13 | | Example 14 | | Example 15 | |
|---|---|---|---|---|---|
| Substrate + HC1.6 | | Substrate + HC1.6 | | Substrate + HC1.6 | |
| $Ta_2O_5$ | 134.67 nm | $Ta_2O_5$ | 133.30 nm | $ZrO_2$ | 43.21 nm |
| $SiO_2$ | 189.09 nm | $SiO_2$ | 183.87 nm | $Ta_2O_5$ | 100.20 nm |
| $Ta_2O_5$ | 79.64 nm | $Ta_2O_5$ | 37.95 nm | $SiO_2$ | 190.15 nm |
| $ZrO_2$ | 24.82 nm | $ZrO_2$ | 70.04 nm | $ZrO_2$ | 96.25 nm |
| $SiO_2$ | 73.28 nm | $SiO_2$ | 87.16 nm | $SiO_2$ | 84.22 nm |
| Air | | Air | | Air | |
| $R_v$ (15°) | 0.74% | $R_v$ (15°) | 0.56% | $R_v$ (15°) | 0.33% |
| $R_m^{NIR}$ (15°) | 33.4% | $R_m^{NIR}$ (15°) | 32.1% | $R_m^{NIR}$ (15°) | 29.3% |
| $R_m^B$ (<15°) | 12.7% | $R_m^B$ (<15°) | 12.5% | $R_m^B$ (<15°) | 12.5% |

-continued

| | | | | | |
|---|---|---|---|---|---|
| $R_m^B{}_{(35°)}$ | 4.2% | $R_m^B{}_{(35°)}$ | 5.9% | $R_m^B{}_{(35°)}$ | 4.5% |
| h* | 313 | h* | 313 | h* | 314 |
| σh* | 3.9 | σh* | 2.4 | σh* | 1.7 |
| C* | 57 | C* | 62 | C* | 67 |
| σC* | 9.4 | σC* | 5.9 | σC* | 6.3 |

| Example 16 | | Example 17 | | Example 18 | |
|---|---|---|---|---|---|
| Substrate + HC1.6 | | Substrate + HC1.6 | | Substrate + HC1.6 | |
| $ZrO_2$ | 61.58 nm | $ZrO_2$ | 61.70 nm | $ZrO_2$ | 69.54 nm |
| $Ta_2O_5$ | 76.97 nm | $Ta_2O_5$ | 81.00 nm | $Ta_2O_5$ | 68.56 nm |
| $SiO_2$ | 187.58 nm | $SiO_2$ | 186.41 nm | $SiO_2$ | 187.74 nm |
| $ZrO_2$ | 96.22 nm | $ZrO_2$ | 95.69 nm | $ZrO_2$ | 100.27 nm |
| $SiO_2$ | 84.31 nm | $SiO_2$ | 82.16 nm | $SiO_2$ | 81.45 nm |
| Air | | Air | | Air | |
| $R_v(15°)$ | 0.42% | $R_v(15°)$ | 0.25% | $R_v(15°)$ | 0.43% |
| $R_m^{NIR}(15°)$ | 30.9% | $R_m^{NIR}(15°)$ | 32.3% | $R_m^{NIR}(15°)$ | 34.0% |
| $R_m^B{}_{(<15°)}$ | 12.5% | $R_m^B{}_{(<15°)}$ | 12.5% | $R_m^B{}_{(<15°)}$ | 12.5% |
| $R_m^B{}_{(35°)}$ | 3.9% | $R_m^B{}_{(35°)}$ | 5.2% | $R_m^B{}_{(35°)}$ | 4.7% |
| h* | 314 | h* | 313 | h* | 313 |
| σh* | 2.3 | σh* | 1.3 | σh* | 2.1 |
| C* | 64 | C* | 68 | C* | 64 |
| σC* | 7.4 | σC* | 5.8 | σC* | 7.0 |

| Example 19 | | Example 20 | | Example 21 | |
|---|---|---|---|---|---|
| Substrate + HC1.6 | | Substrate + HC1.5 | | Substrate + HC1.6 | |
| $ZrO_2$ | 25.64 nm | $ZrO_2$ | 79.28 nm | $ZrO_2$ | 63.41 nm |
| $Ta_2O_5$ | 113.90 nm | $Ta_2O_5$ | 60.18 nm | $Ta_2O_5$ | 78.15 nm |
| $SiO_2$ | 202.68 nm | $SiO_2$ | 190.44 nm | $SiO_2$ | 184.20 nm |
| $Ta_2O_5$ | 59.14 nm | $Ta_2O_5$ | 55.68 nm | $Ta_2O_5$ | 6.50 nm |
| $ZrO_2$ | 48.17 nm | $ZrO_2$ | 38.34 nm | $ZrO_2$ | 90.39 nm |
| $SiO_2$ | 64.65 nm | $SiO_2$ | 78.90 nm | $SiO_2$ | 82.71 nm |
| Air | | Air | | Air | |
| $R_v(15°)$ | 0.85% | $R_v(15°)$ | 0.59% | $R_v(15°)$ | 0.24% |
| $R_m^{NIR}(15°)$ | 32.7% | $R_m^{NIR}(15°)$ | 32.7% | $R_m^{NIR}(15°)$ | 32.2% |
| $R_m^B{}_{(<15°)}$ | 15.8% | $R_m^B{}_{(<15°)}$ | 16.8% | $R_m^B{}_{(<15°)}$ | 12.5% |
| $R_m^B{}_{(35°)}$ | 6.0% | $R_m^B{}_{(35°)}$ | 5.6% | $R_m^B{}_{(35°)}$ | 5.1% |
| h* | 318 | h* | 313 | h* | 313 |
| σh* | 1.7 | σh* | 2.6 | σh* | 1.2 |
| C* | 69 | C* | 71 | C* | 68 |
| σC* | 6.4 | σC* | 9.4 | σC* | 5.6 |

| Example 22 | | Example 23 | |
|---|---|---|---|
| Substrate + HC1.6 | | Substrate + HC1.6 | |
| $ZrO_2$ | 68.36 nm | $ZrO_2$ | 43.00 nm |
| $Ta_2O_5$ | 69.08 nm | $Ta_2O_5$ | 88.82 nm |
| $SiO_2$ | 179.56 nm | $SiO_2$ | 187.59 nm |
| $Ta_2O_5$ | 31.17 nm | $Ta_2O_5$ | 82.26 nm |
| $ZrO_2$ | 72.35 nm | $ZrO_2$ | 14.46 nm |
| $SiO_2$ | 84.90 nm | $SiO_2$ | 88.95 nm |
| Air | | Air | |
| $R_v(15°)$ | 0.37% | $R_v(15°)$ | 0.90% |
| $R_m^{NIR}(15°)$ | 33.3% | $R_m^{NIR}(15°)$ | 31.60% |
| $R_m^B{}_{(<15°)}$ | 12.5% | $R_m^B{}_{(<15°)}$ | 12.50% |
| $R_m^B{}_{(35°)}$ | 5.1% | $R_m^B{}_{(35°)}$ | 5.70% |
| h* | 313 | h* | 300 |
| σh* | 1.7 | σh* | 3.5 |
| C* | 65 | C* | 49 |
| σC* | 6.0 | σC* | 3.9 |

| Example 24 | | Example 25 | | Example 26 | |
|---|---|---|---|---|---|
| Air | | Air | | Air | |
| SiO2 | 66.72 | SiO2 | 66.4 | SiO2 | 67.35 |
| ZrO2 | 43.91 | ZrO2 | 45.44 | ZrO2 | 55.06 |
| TiO2 | 44.57 | Nb2O5 | 40.5 | Ta2O5 | 31.9 |
| ZrO2 | 30.12 | ZrO2 | 36.19 | ZrO2 | 32.62 |
| SiO2 | 158.55 | SiO2 | 153.29 | SiO2 | 214.49 |

-continued

| | | | | | |
|---|---|---|---|---|---|
| ZrO2 | 34.95 | ZrO2 | 35.42 | ZrO2 | 26.05 |
| TiO2 | 59.23 | Nb2O5 | 61.29 | Ta2O5 | 83.3 |
| ZrO2 | 54.77 | ZrO2 | 51.59 | ZrO2 | 42.58 |
| Substrate + HC1.5 | | Substrate + HC1.5 | | Substrate + HC1.5 | |
| $R_v$ (15°) | 0.60% | $R_v$ (15°) | 0.60% | $R_v$ (15°) | 0.93% |
| $R_m^{NIR}$ (15°) | 40.64% | $R_m^{NIR}$ (15°) | 41.40% | $R_m^{NIR}$ (15°) | 30.30% |
| $R_m^B$ (<15°) | 12.9% | $R_m^B$ (<15°) | 8.6% | $R_m^B$ (<15°) | 21.6% |
| $R_m^B$ (35°) | 6.9% | $R_m^B$ (35°) | 3.7% | $R_m^B$ (35°) | 16.6% |
| h* | 308 | h* | 305 | h* | 311 |
| σh* | 2.7 | σh* | 5.3 | σh* | 1.8 |
| C* | 58 | C* | 44 | C* | 78 |
| σC* | 5.2 | σC* | 6 | σC* | 1.6 |

| Example 27 | | Example 28 | |
|---|---|---|---|
| Air | | Air | |
| SiO2 | 68.02 | SiO2 | 67.87 |
| ZrO2 | 44.7 | ZrO2 | 45.45 |
| TiO2 | 42.74 | TiO2 | 35.21 |
| ZrO2 | 32.21 | Ta2O5 | 33.74 |
| SiO2 | 157.4 | SiO2 | 167.01 |
| ZrO2 | 32.91 | Ta2O5 | 31.65 |
| Nb2O5 | 62.07 | TiO2 | 55.66 |
| ZrO2 | 53.02 | ZrO2 | 52.74 |
| Substrate + HC1.5 | | Substrate + HC1.5 | |
| $R_v$ (15°) | 0.60% | $R_v$ (15°) | 0.60% |
| $R_m^{NIR}$ (15°) | 41.10% | $R_m^{NIR}$ (15°) | 40.70% |
| $R_m^B$ (<15°) | 12.2% | $R_m^B$ (<15°) | 11.3% |
| $R_m^B$ (35°) | 6.2% | $R_m^B$ (35°) | 5.0% |
| h* | 308 | h* | 306 |
| σh* | 2.9 | σh* | 4.2 |
| C* | 56 | C* | 52 |
| σC* | 5.6 | σC* | 7.4 |

| Example 29 | | Example 30 | | Example 31 | |
|---|---|---|---|---|---|
| Air | | Air | | Air | |
| SiO2 | 71.01 | SiO2 | 69.25 | SiO2 | 69.42 |
| Ta2O5 | 37.3 | Ta2O5 | 46.5 | HfO2 | 45.34 |
| TiO2 | 29.86 | Nb2O5 | 32.71 | TiO2 | 44 |
| Ta2O5 | 39.46 | Ta2O5 | 35.89 | HfO2 | 27.97 |
| SiO2 | 162.76 | SiO2 | 187.48 | SiO2 | 152.31 |
| Ta2O5 | 27.46 | Ta2O5 | 28.23 | HfO2 | 39.03 |
| TiO2 | 54.13 | Nb2O5 | 58.21 | TiO2 | 51.67 |
| Ta2O5 | 52.4 | Ta2O5 | 53.26 | HfO2 | 66.78 |
| Substrate + HC1.5 | | Substrate + HC1.5 | | Substrate + HC1.6 | |
| $R_v$ (15°) | 0.63% | $R_v$ (15°) | 0.82% | $R_v$ (15°) | 0.66% |
| $R_m^{NIR}$ (15°) | 42.20% | $R_m^{NIR}$ (15°) | 41.50% | $R_m^{NIR}$ (15°) | 35.20% |
| $R_m^B$ (<15°) | 7.7% | $R_m^B$ (<15°) | 20.2% | $R_m^B$ (<15°) | 18.9% |
| $R_m^B$ (35°) | 2.5% | $R_m^B$ (35°) | 13.1% | $R_m^B$ (35°) | 13.3% |
| h* | 310 | h* | 313 | h* | 308 |
| σh* | 7.5 | σh* | 1.5 | σh* | 1.7 |
| C* | 40 | C* | 77 | C* | 73 |
| σC* | 7.7 | σC* | 4.2 | σC* | 3.1 |

| Example 32 | | Example 33 | |
|---|---|---|---|
| Air | | Air | |
| SiO2 | 67.89 | SiO2 | 64.51 |
| HfO2 | 45.93 | ZrO2 | 43.72 |
| Nb2O5 | 43.62 | Nb2O5 | 46 |
| HfO2 | 32.15 | HfO2 | 34.73 |
| SiO2 | 145.39 | SiO2 | 145.82 |
| HfO2 | 39.48 | HfO2 | 37.81 |
| Nb2O5 | 54.91 | Nb2O5 | 63.02 |
| HfO2 | 60.08 | ZrO2 | 52.62 |
| Substrate + HC1.6 | | Substrate + HC1.5 | |
| $R_v$ (15°) | 0.63% | $R_v$ (15°) | 0.60% |
| $R_m^{NIR}$ (15°) | 36.70% | $R_m^{NIR}$ (15°) | 41.60% |
| $R_m^B$ (<15°) | 12.7% | $R_m^B$ (<15°) | 8.4% |
| $R_m^B$ (35°) | 8.5% | $R_m^B$ (35°) | 3.7% |
| h* | 306 | h* | 307 |

-continued

| | | | |
|---|---|---|---|
| σh* | 1.9 | σh* | 4.5 |
| C* | 59 | C* | 44 |
| σC* | 3.3 | σC* | 5.4 |

It could be observed that the optical articles of the invention comprising an AR coating with 4 layers without doublet HI layers(s) (examples 9 to 12) or with one doublet HI layer (examples 13-18) or with two doublet HI layers (examples 19 to 23) or with two triplet HI layers (examples 24 to 33) possess both very good antireflective properties in the visible region (Rv<1.0%), high reflection in the NIR region (≥29.3%), high reflection in the harmful blue light region (≥7%), with no detrimental influence on the aesthetic performance and robustness properties (low standard deviations of hue: σh* and chroma: σC*).

Moreover, the lenses obtained in Examples 1 to 33 have outstanding transparency properties, a good resistance to abrasion and to scratches, and a good resistance to a hot water dip-treatment, followed with a mechanical stress on the surface. The adhesion of the coatings to the substrate was also very satisfactory.

The invention claimed is:

1. An optical article comprising a transparent substrate with a front main face and a rear main face, at least one of the main faces being coated with an antireflective coating comprising at least two layers having a low refractive index, which is <1.55, each defined as an "LI layer", and at least two layers having a high refractive index, which is 1.55, each defined as an "HI layer", one of the at least two HI layers being the layer which is the nearest from said substrate among said LI and HI layers, wherein a layer of the antireflective coating is defined as having a thickness higher than or equal to 1 nm, said HI and LI layers do not need to alternate with each other, provided that when the antireflective coating includes alternating HI and LI layers, at least one HI layer may be made of a doublet or a triplet, a doublet is made from the deposition of a first high refractive index material on which a second high refractive index material is directly deposited, and a triplet is made from the deposition of a first high refractive index material on which a second high refractive index material is directly deposited, on which a third high refractive index material is directly deposited, wherein the total physical thickness of said antireflective coating is equal to or lower than 600 nm, and wherein the antireflection coating is configured such that:

the mean reflection factor in the near infrared (NIR) region $R_m^{NIR}$ is higher than or equal to 20% at an angle of incidence lower than 35°; and the mean reflection factor $R_m^B$ of blue light at a wavelength ranging from 420 to 450 nm has a first value $R_m^B{}_{(<15°)}$ which is higher than or equal to 7.0% at an angle of incidence lower than 15°, and the mean light reflection factor in the visible region $R_v$ is lower than or equal to 2.0% for at least an angle of incidence lower than 35°, and wherein the mean reflection factor $R_m^B$ of blue light at a wavelength ranging from 420 to 450 nm has a second value $R_m^B{}_{(35°)}$ at an angle of incidence of 35° which fulfills following condition: $R_m^B{}_{(<15°)} - R_m^B{}_{(35°)} \geq 5\%$.

2. The optical article of claim 1, wherein the mean light reflection factor in the visible region $R_v$ of said antireflective coating is lower than or equal to 1.5% for at least an angle of incidence lower than 35°.

3. The optical article of claim 2, wherein the mean light reflection factor in the visible region $R_v$ of said antireflective coating is lower than or equal to 1.0% for at least an angle of incidence lower than 35°.

4. The optical article of claim 1, wherein the mean reflection factor in the near infrared (NIR) region $R_m^{NIR}$ of said antireflective coating is higher than or equal to 25% at an angle of incidence lower than 35°.

5. The optical article of claim 4, wherein the mean reflection factor in the near infrared (NIR) region $R_m^{NIR}$ of said antireflective coating is higher than or equal to 26% at an angle of incidence lower than 35°.

6. The optical article of claim 5, wherein the mean reflection factor in the near infrared (NIR) region $R_m^{NIR}$ of said antireflective coating is higher than or equal to 30% at an angle of incidence lower than 35°.

7. The optical article of claim 1, wherein the antireflective coating has a Chroma C* which is higher or equal to 20 of the international colorimetric system CIE L*a*b*.

8. The optical article of claim 7, wherein the antireflective coating has a Chroma C* which is higher or equal to 25 of the international colorimetric system CIE L*a*b*.

9. The optical article of claim 8, wherein the antireflective coating has a Chroma C* which is higher or equal to 30 of the international colorimetric system CIE L*a*b*.

10. The optical article of claim 1, wherein the sum of physical thickness of all HI layers is ranging from 190 nm to 265 nm.

11. The optical article of claim 10, wherein the sum of physical thickness of all HI layers is ranging from 195 nm to 260 nm.

12. The optical article of claim 1, wherein the number of layers of said antireflective coating is lower than or equal to 8.

13. The optical article of claim 1, wherein the layer which is the farthest from the substrate of said antireflective coating is a LI layer having a physical thickness ranging from 55 to 95 nm.

14. The optical article of claim 13, wherein the layer which is the farthest from the substrate of said antireflective coating is a LI layer having a physical thickness ranging from 60 to 92 nm.

15. The optical article of claim 1, wherein said antireflective coating comprises in the direction moving away from the substrate, the following layers which are in direct contact with each other: (1) an HI layer/(2) a LI layer/(3) an HI layer/and (4) a LI layer.

16. The optical article of claim 15, wherein the (1) HI layer, the (3) HI layer or both the (1) HI layer and the (3) HI layer of said antireflective coating is a doublet (bilayer) or a triplet (trilayer) made of distinct metal oxides.

17. The optical article of claim 15, wherein said antireflective coating comprises in the direction moving away from the substrate a:

HI layer having a physical thickness ranging from 130 to 160 nm;

LI layer having a physical thickness ranging from 140 to 215 nm;

HI layer having a physical thickness ranging from 90 to 130 nm; and

LI layer having a physical thickness ranging from 60 to 90 nm.

18. The optical article of claim 1, wherein said antireflective coating comprises in the direction moving away from the substrate, the following layers which are in direct contact with each other: (1) a HI layer/(2) a LI layer/(3) a HI layer/(4) a LI layer, (5) a HI layer/and (6) a LI layer.

19. The optical article of claim 18, wherein said antireflective coating comprises in the direction moving away from the substrate a:
   (1) HI layer having a physical thickness ranging from 15 to 60 nm;
   (2) LI layer having a physical thickness ranging from 8 to 25 nm;
   (3) HI layer having a physical thickness ranging from 80 to 120 nm;
   (4) LI layer having a physical thickness ranging from 170 to 195 nm;
   (5) HI layer having a physical thickness ranging from 80 to 120 nm; and
   (6) LI layer having a physical thickness ranging from 70 to 95 nm.

20. The optical article of claim 18, wherein said antireflective coating comprises in the direction moving away from the substrate a:
   HI layer having a physical thickness ranging from 15 to 22 nm;
   LI layer having a physical thickness ranging from 10 to 25 nm;
   HI layer having a physical thickness ranging from 80 to 115 nm;
   LI layer having a physical thickness ranging from 170 to 185 nm;
   HI layer having a physical thickness ranging from 85 to 95 nm; and
   LI layer having a physical thickness ranging from 75 to 90 nm.

21. The optical article of claim 1, wherein said optical article is an ophthalmic lens.

* * * * *

UNITED STATES PATENT AND TRADEMARK OFFICE
CERTIFICATE OF CORRECTION

| | |
|---|---|
| PATENT NO. | : 11,199,729 B2 |
| APPLICATION NO. | : 16/324043 |
| DATED | : December 14, 2021 |
| INVENTOR(S) | : Xingzhao Ding, Shi Qin Gracia Loo and Andrew Rosales Pelayo |

It is certified that error appears in the above-identified patent and that said Letters Patent is hereby corrected as shown below:

In the Claims

Claim 1, Column 25, Line 32:
Delete "which is 1.55" and replace with -- which is $\geq 1.55$ --.

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*